US005758558A

United States Patent [19]

Squires

[11] Patent Number: 5,758,558

[45] Date of Patent: Jun. 2, 1998

[54] PRECISION MEASURING APPARATUS FOR LOCATING WORKPIECES FOR WORK OPERATIONS

[76] Inventor: Richard D. Squires, 517 Rosebriar Ct., Greensboro, N.C. 27407

[21] Appl. No.: 402,098

[22] Filed: Mar. 10, 1995

Related U.S. Application Data

[63] Continuation-in-part of Ser. No. 292,788, Aug. 18, 1994.

[51] Int. Cl.⁶ .................................................. B26D 7/27
[52] U.S. Cl. ......................... 83/522.18; 83/522.15; 408/91; 409/220; 33/712; 33/626
[58] Field of Search ..................... 83/522.11, 522.15, 83/522.16, 522.18, 522.19, 522.25, 522.24, 522.29, 522.17, 452, 468, 464; 408/91, 234; 409/218, 220; 33/710, 712, 810, 811, 812, 818, 823, 802, 792, 626, 641

[56] References Cited

U.S. PATENT DOCUMENTS

| | | | |
|---|---|---|---|
| 680,937 | 8/1901 | Ohl et al. | 83/522.19 X |
| 1,467,043 | 9/1923 | Kearns | 29/26 R |
| 1,660,435 | 2/1928 | Craley | 409/218 |
| 1,757,929 | 5/1930 | Shaw et al. | 409/220 |
| 1,940,178 | 12/1933 | Mohr | 29/69 |
| 2,039,231 | 4/1936 | Lindner | 33/710 X |
| 2,042,847 | 6/1936 | Holtschneider | 90/56 |
| 2,167,189 | 7/1939 | Verderber | 77/4 |
| 2,236,881 | 4/1941 | Rusnak | 33/181 |
| 2,289,874 | 7/1942 | Curtis | 409/218 X |
| 2,319,480 | 5/1943 | Saving et al. | 90/21 |
| 2,370,882 | 3/1945 | Serna | 90/58 |
| 2,407,769 | 9/1946 | Anderson | 408/91 X |
| 2,548,418 | 4/1951 | Bernheim et al. | 51/55 |
| 2,584,963 | 2/1952 | Hoelscher | 33/710 X |
| 2,648,909 | 8/1953 | Zajdel | 33/170 |
| 2,655,959 | 10/1953 | Krueger et al. | 83/522.19 X |
| 2,666,263 | 1/1954 | Laserson | 33/818 X |
| 2,788,582 | 4/1957 | Middeler | 33/818 X |
| 2,829,439 | 4/1958 | Cunningham | 33/818 X |
| 3,027,646 | 4/1962 | Brichard et al. | 33/32 |
| 3,092,913 | 6/1963 | Bugge | 33/166 |
| 3,181,244 | 5/1965 | Sosa | 33/811 X |
| 3,221,841 | 12/1965 | Kraklau, Jr. | 188/72 |
| 3,316,646 | 5/1967 | Novey | 33/125 |
| 3,345,747 | 10/1967 | Sattler | 33/710 X |
| 3,461,776 | 8/1969 | Hamori et al. | 90/58 |
| 3,566,827 | 3/1971 | Moseley | 409/218 X |
| 3,918,167 | 11/1975 | Gerber | 33/185 R X |
| 4,936,722 | 6/1990 | Schwinn | 409/220 X |
| 5,103,541 | 4/1992 | Ferletic | 409/218 X |

FOREIGN PATENT DOCUMENTS 8902571  3/1989  WIPO ................................ 33/712

*Primary Examiner*—Rinaldi I. Rada
*Assistant Examiner*—Boyer Ashley
*Attorney, Agent, or Firm*—Neil F. Markva

[57] ABSTRACT

A precision measuring mechanism includes a precision threaded rod member and an indicating element mounted to move along a linear graduated scale upon rotation of the precision threaded rod member. A circumferential scale has a plurality of marks spaced from a circumferential zero point to indicate a preselected fractional amount of rod member rotation between adjacent circumferential marks. The linear graduated scale includes a plurality of rotation counting marks spaced from a linear zero point and laterally spaced with respect to each other along the linear scale for a linear distance that corresponds and is equal to a complete rotation of the precision threaded rod member. The precision measuring mechanism is also usable with a work operation tool machine which fixes a workpiece on a workpiece supporting table that moves along both an x-axis coordinate and a y-axis coordinate such as a milling machine, drilling machine, mill-drill machine, and the like.

47 Claims, 14 Drawing Sheets

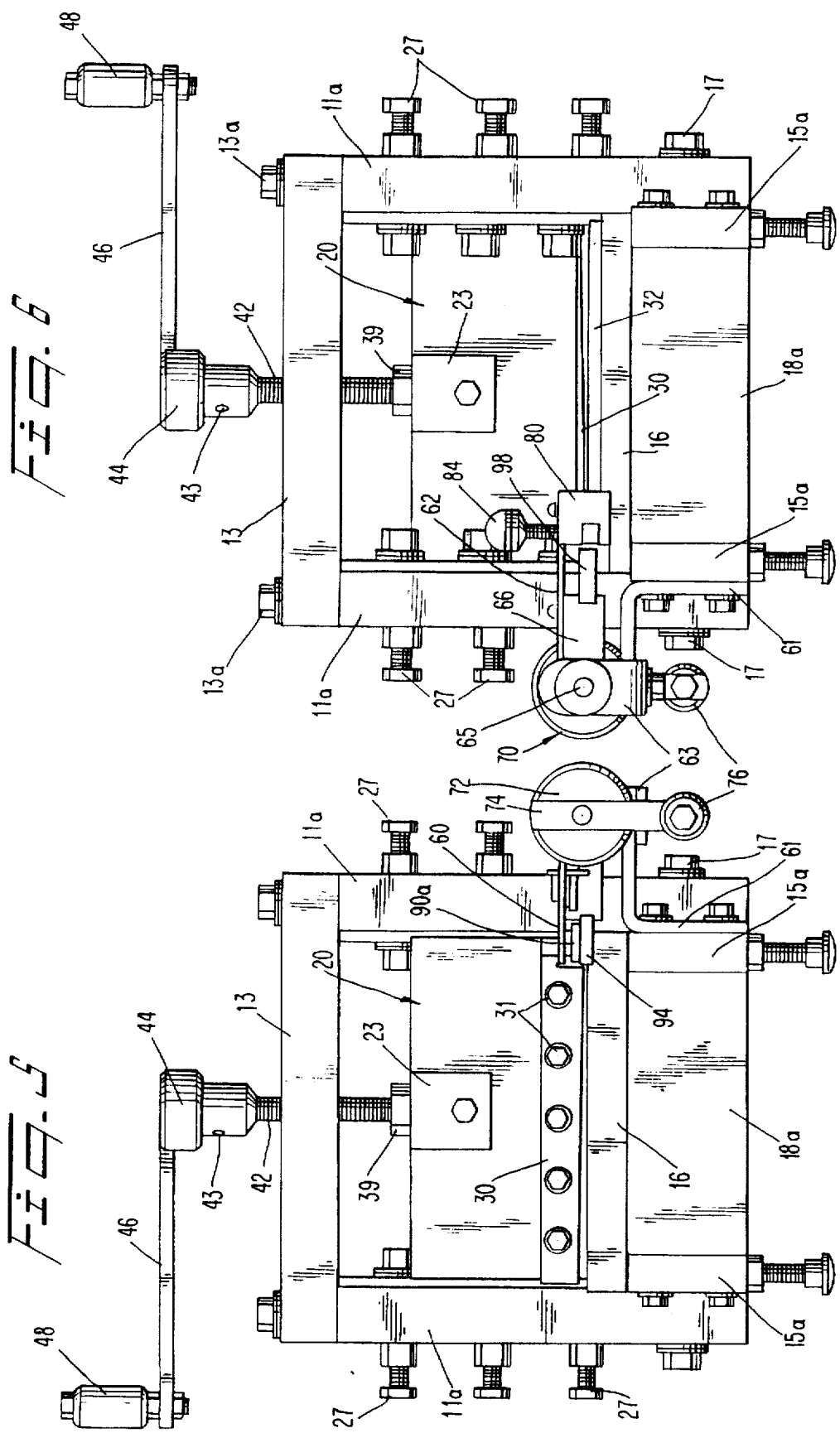

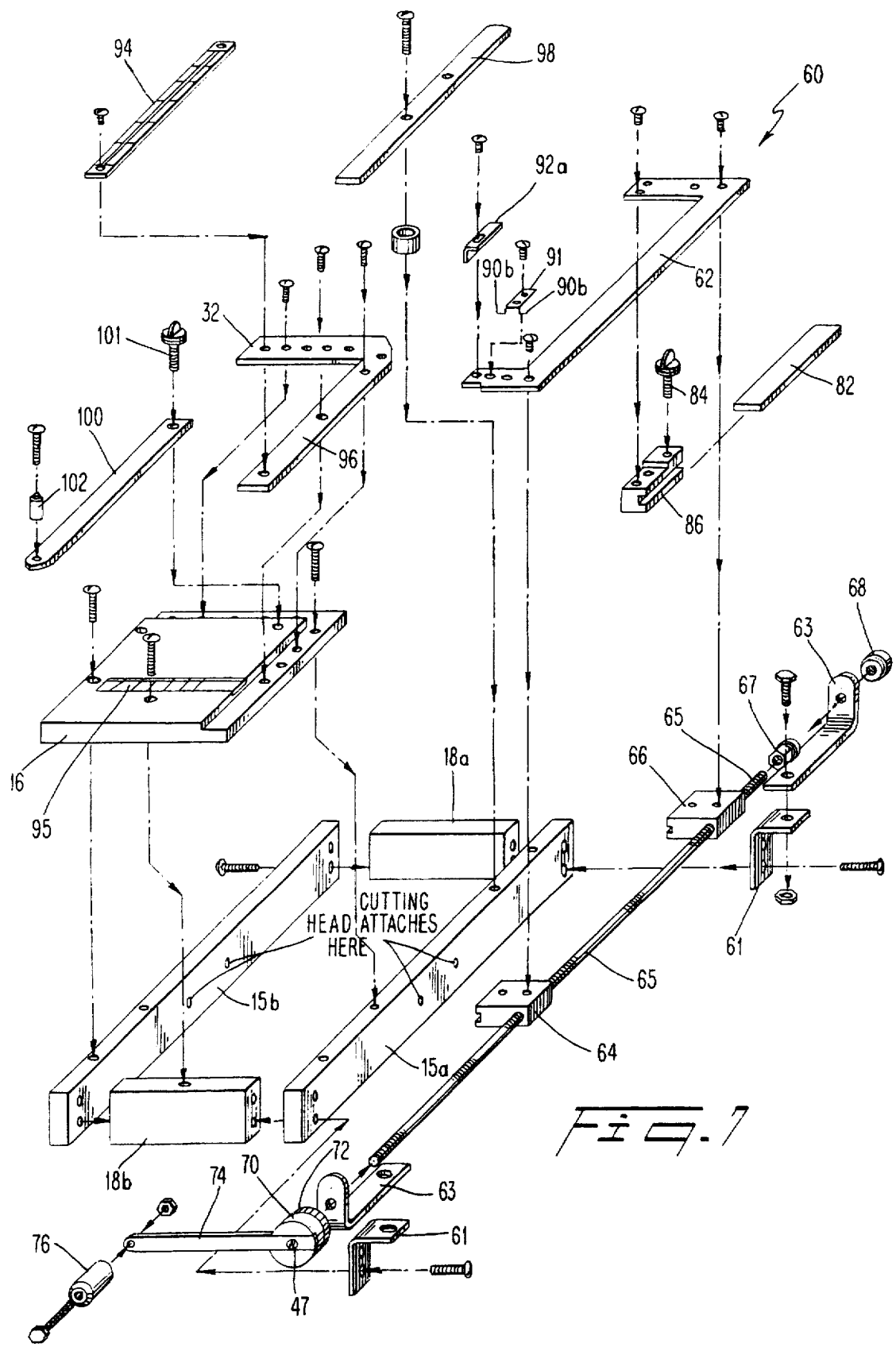

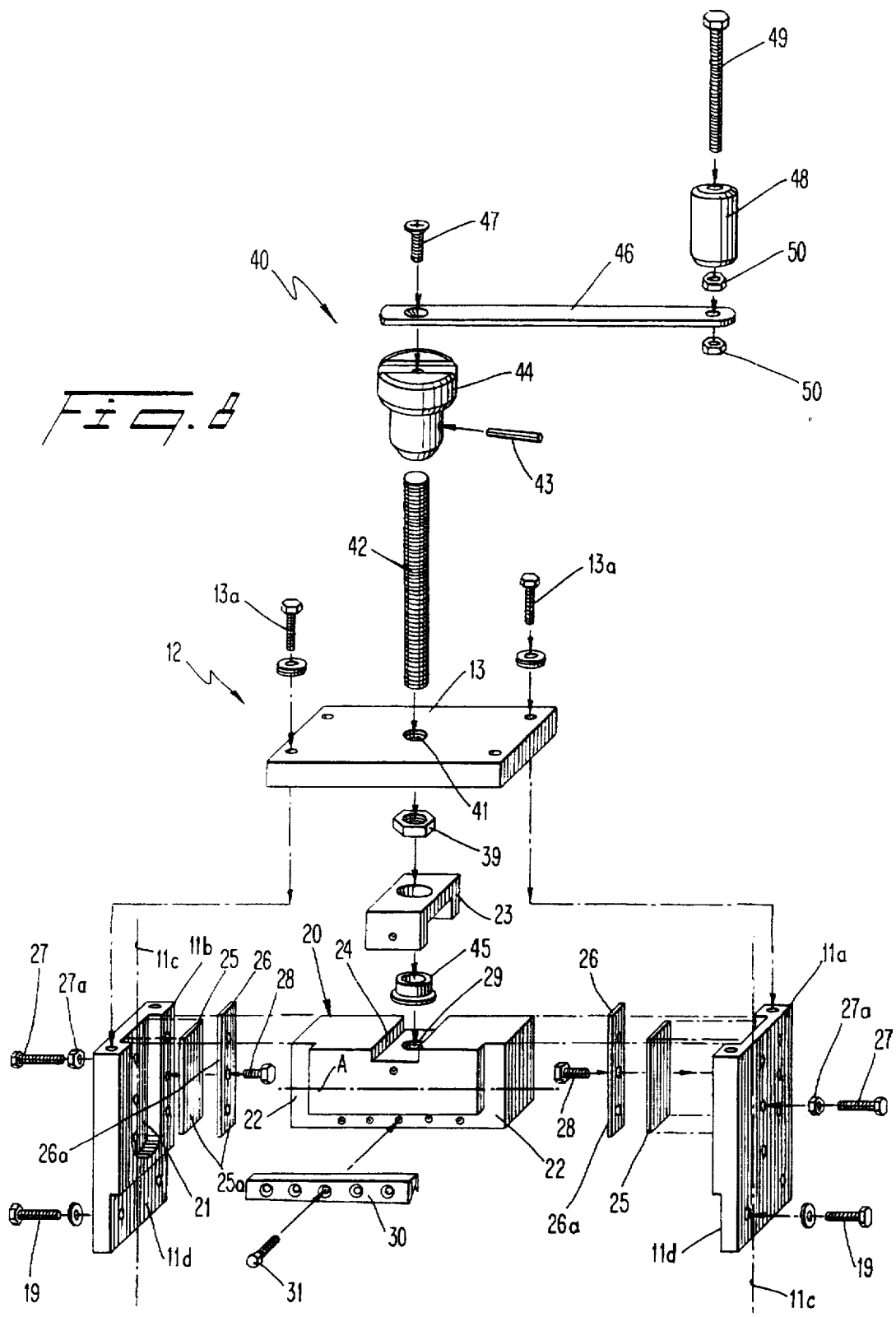

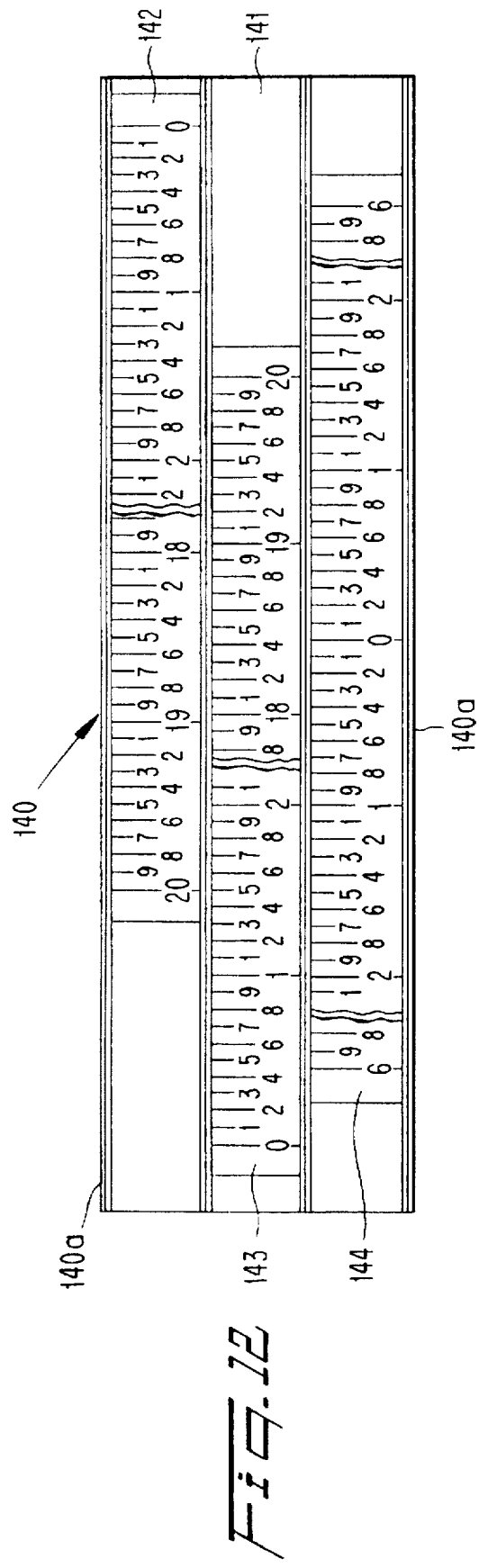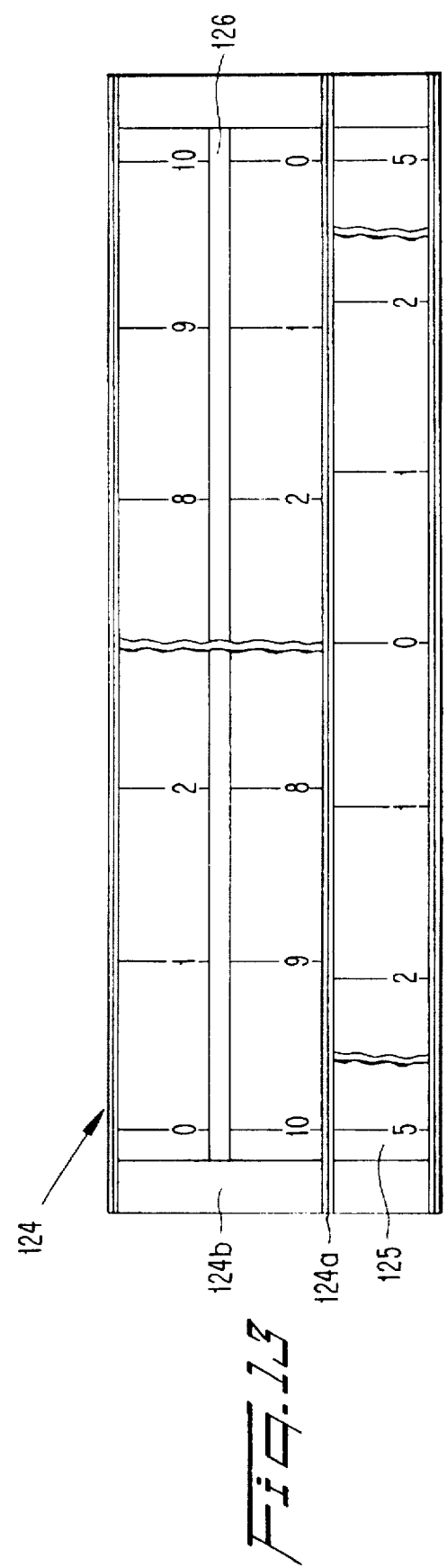

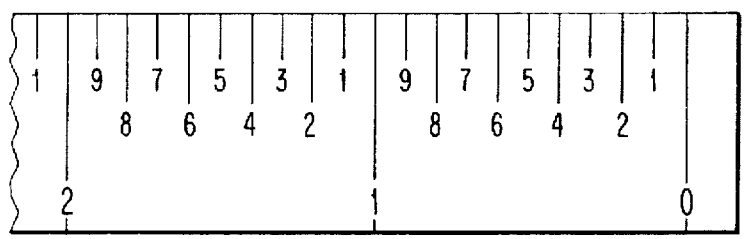
10-PITCH INDICATOR
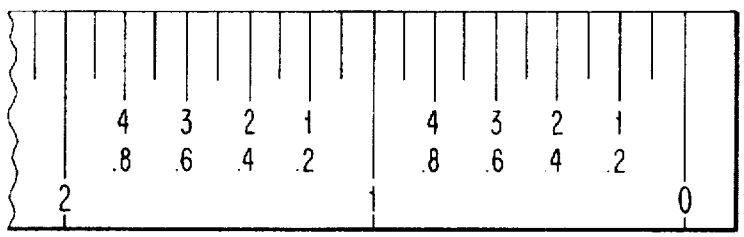
5-PITCH INDICATOR
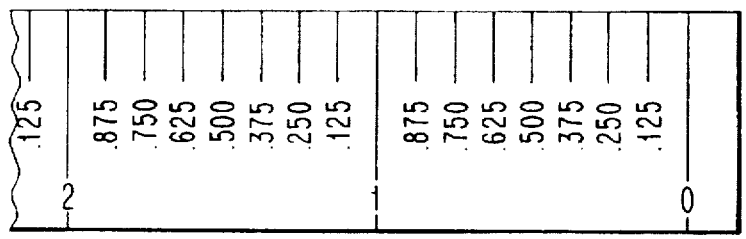
8-PITCH INDICATOR
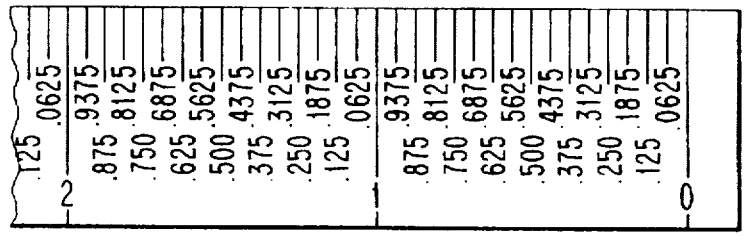
16-PITCH INDICATOR

PRECISION MEASURING APPARATUS FOR LOCATING WORKPIECES FOR WORK OPERATIONS

RELATED APPLICATION

This is a continuation-in-part of U.S. application Ser. No. 08/292,788 filed Aug. 18, 1994 and entitled PRECISION MEASURING AND CUTTING ASSEMBLY AND METHOD and is incorporated herein in its entirety by reference.

FIELD OF THE INVENTION

This invention relates to the field of precision locating a workpiece with respect to work operation means for performing work at a preselected location on a workpiece. More particularly, the invention relates to the precision locating of materials for work operations such as cutting stock material, and drilling, milling, and lathe operations on workpieces.

BACKGROUND OF THE INVENTION

The existing method used by modelers for measuring and cutting segments from sheet stock is laborious. First, they accurately measure the width to be cut from a sheet stock and mark the sheet surface along a straight edge to designate the cutting line. With one hand, the straight edge is pressed against the sheet while the other hand guides a cutting blade along the line and against the straight edge. The modeler must hold the straight edge tightly against the sheet stock and carefully apply cutting pressure to the blade. If the straight edge moves or for some reason the cutting blade deviates from the cutting line, the modeler may have to make another cut from the same or another sheet of material.

The current measuring and cutting process in the hobby industry is most painstaking. Therefore, a person's ability to model is completely dependent on the person's skill in manually holding the straight edge and the sheet being cut against a support surface while carefully and accurately guiding a cutting blade along a manually measured cut line.

Known cutting and measuring devices are shown in U.S. Pat. Nos. 219,681; 954,052; 957,747; 1,416,800; 1,419,789; 1,681,739; 2,071,402; 2,130,818; 2,488,610; 3,176,568; 3,240,094; 3,376,728; 3,491,643; 3,803,968; 4,204,450; 4,581,825; 4,936,177; and 5,105,703. None of these prior art devices are useful for effecting the degree of accuracy and precision required to produce detailed structures.

The measuring system of this invention is related to other applications in addition to the novel cutting assembly disclosed herein. Particularly, the invention addresses a need for an inexpensive method of accurately locating workpieces requiring a plurality of directions for workpiece movement to effect precision disposition of the workpiece with respect to a work tool in machines that perform various work operations. The manual measuring system of this invention may be used on such machines as milling machines, drilling machines, and mill-drill machines.

Today many milling machines are equipped with an electronic digital readout system that is quite expensive. Therefore the electronic system is not generally available to individuals and smaller businesses or manufacturers who do not have the resources to purchase and use milling machines so equipped.

All milling machines have manually rotatable feed cranks attached for rotating a precision threaded rod member having a preselected pitch. With a ten pitch precision threaded screw, ten complete turns will effect one inch of movement for any correspondingly threaded part moving along the elongated threaded rod member. Such a known feed crank assembly drives either the saddle or the work table upon which a workpiece is mounted in a milling or drilling machine.

U.S. Pat. Nos. 3,461,776; 3,918,167; and 4,936,722 show milling machine positioning devices effecting an x-y movement to position the workpiece with respect to the operating tool.

Each of the U.S. Pat. Nos. 1,660,435; 1,757,929; 1,940,178; 2,167,189; 2,236,881; 2,548,418; and 3,221,841 discloses a combination of a linear scale with a micrometer measuring device.

U.S. Pat. Nos. 1,467,043; 2,042,847; 2,319,480; 2,370,882; 2,648,909; and 3,316,646 each discloses the use of a circumferential graduated scale on a hand-operated rotating feed crank for adjusting work tables. In particular, U.S. Pat. No. 3,316,646 shows a combination of a linear scale with a circumferential scale mounted on a manually-operated handle. For the purpose of background and establishing the status of the prior art, U.S. Pat. No. 3,316,646 is incorporated herein in its entirety by reference. This particular known device and all other similar devices, require the visual determination of the measurements on a linear scale for achieving any degree of accuracy for the positioning of the workpiece with respect to the operating tool.

Most all existing milling machines, however, have only a graduated circumferential scale and a zero setting function used to measure the movement of a part threadingly engaged with a precision threaded rod member for each rotation of the manually rotatable handle. No linear scale is included with the measuring systems on such milling machines.

In those milling machines that do not include a linear scale, the user must rely solely on the need to count rotations of the hand crank for setting the position of the tool means at the desired location to perform a work operation on the workpiece. More specifically, to measure the relative adjustment of the linear distance between the workpiece and tool means on a workpiece support means of such known assemblies, the machine user must make a course and a fine adjustment. The coarse adjustment involves counting the turns or rotations of the crank that rotates the threaded rod member. The relative position of the tool means with respect to the workpiece is; thus adjusted for a lineal distance equal to the number of crank rotations multiplied by the smallest measurement determined by the space between the circumferential scale marks. For example, if the circumferential scale is divided into thousandths of an inch and the user needs to effect the relative movement of 0.975 of an inch, the user first must count nine complete rotations of the hand crank determined by the number of times the circumferential zero point moves to the fixed zero point juxtaposed the rotatable circumferential scale. Nine rotations of the hand crank effects movement for a total of 0.9 of an inch. The crank is then turned another partial rotation or fine adjustment to read 0.075 on the circumferential scale past the fixed zero point indicator. The fine adjustment completes the setting of the relative distance moved between the tool means and workpiece at the desired 0.975 of an inch. This prior art procedure is extremely slow and requires much concentration to keep the correct count of the turns to record the desired measurement.

Any distraction for the machine user can cause a loss of the count or instill a question in the counting process of rotating the threaded rod member. If this occurs, the only alternative is to reset the zero point, at the edge of the workpiece for example, and start over to again count the rotations of the threaded member. Where there are a plurality of work operations to be done at different places on the workpiece, it even becomes more difficult to keep track of the number of rotations. This is particularly true if it is necessary to count numerous rotations.

Each known procedure for measuring the relative linear movement effected by rotating the threaded rod member involves loosening a thumb set screw for the circumferential scale and resetting the circumferential dial to zero after each measurement. Such procedure required in prior art machine operations slows the work and also tends to lose accuracy.

Backlash occurs in each device, moreover, when there is a change in direction of rotation of the threaded rod member. Correction for backlash every time the direction of movement for the working table changes along either the x-axis or y-axis necessarily slows the work operation. With each backlash correction, some accuracy may be lost amounting to one or more thousandths of an inch. The backlash removal procedure is performed when the table is locked. Unless the hand crank is rotated very carefully, it may bump the table hard enough to move it a few thousandths of an inch. Thus, even with the table locked, more accuracy of the measurement may be lost.

When measurements are made along the x-axis, the table having two table locks and two table stops is moved. When measurements are made down the y-axis, the milling machine saddle, which has two saddle locks but no saddle stops is moved. Without stops as a point of reference, it becomes very difficult to do more than very simple measuring on the y-axis without much loss of time and accuracy.

The more locations required to be defined on a workpiece during all work operations, the more complex is the particular milling job. Milling operations at two or three locations should involve a relatively simple work operation job. If, however, a plurality of drilling operations had to produce 20 holes for example, it would be very difficult to do breaking the job into several time-consuming small jobs. Each job would require the resetting of the zero point on the rotating hand crank and counting the number of rotations to effect a course measurement followed by a fine adjustment of recording the fractional amount of the last partial rotation on the circumferential scale. Each measurement is thereby subject to the related problems discussed above.

In those machines that include linear scales having laterally spaced measuring marks that are spaced by a predetermined lineal measurement, the linear scales must be visually read as an indicating pointer moves along to determine the distance being moved in terms of some lineal measurement of movement, such as fractions of an inch. The prior art of the above-noted patents incorporate this type of a measurement assembly. None of the prior art combination measuring systems reveals the use of rotation counting marks to effect a precision measuring procedure.

PURPOSE OF THE INVENTION

The primary object of this invention is to provide a measuring system to enhance the counting of the turns of a hand crank that rotates a precision threaded rod member for locating a workpiece with respect to a machine tool for effecting work operations on the workpiece.

Another object of the invention is to provide a measuring system that enables a plurality of work operations to be performed on a workpiece without having to reset the zero setting of a circumferential dial on a hand crank each time a measurement is required.

Another object is to provide a manual measuring system that is as accurate as a digital readout system that requires relatively time-consuming procedures for locating a workpiece to effect multiple work operations.

A further object of the invention is to provide an apparatus for measuring movement between a workpiece and tool member to an accuracy of 0.001 of an inch by simply turning a knob and rotating a crank handle for a preselected number of rotations indicated on a linear graduated means.

Another object is to provide a measuring assembly that removes the problem of eyestrain on close measurements required for prior art methods of locating a workpiece with respect to a work tool.

SUMMARY OF THE INVENTION

The invention is directed to a measuring assembly for precision locating a workpiece with respect to work operation means for performing work at a preselected location or locations on the workpiece. The measuring assembly comprises a precision threaded rod member having a preselected thread configuration. The rod member is rotatably mounted for effecting movement of indicator means with respect to a linear path when the threaded rod member rotates.

The assembly further comprises rod rotation means, circumferential scale means, and linear graduated means. The rod rotation means turns the threaded rod member about an axis of rotation that is coextensive with the longitudinal axis of the rod member. The circumferential scale means is mounted to correspondingly rotate with the threaded rod member for indicating a preselected fractional amount of a complete rotation of the threaded rod member about its longitudinal axis. The linear graduated means includes a plurality of rotation counting marks laterally spaced with respect to each other by a predetermined linear distance between successive rotation counting marks.

The linear distance between the rotation counting marks corresponds and is equal to an amount of movement of indicator means along the linear path upon a complete rotation of the threaded rod member. The indicator means includes a rotation counting mark indicating means for designating a related rotation mark upon each complete rotation of the threaded rod member. In a specific embodiment, the rotation counting mark indicating means is a pointer element.

The measuring assembly of the invention includes workpiece setting means which includes the linear scale or graduated means, indicator carrier means, and precision threaded rod means. The measuring assembly is useful for any precision machine work operations assembly that has frame means, workpiece support means, and tool means for performing work operations on a workpiece disposed on the workpiece support means. The workpiece setting means locates the workpiece with respect to the tool means for performing the desired work operation.

The threaded rod means has at least one threaded rod member rotatably mounted for moving the indicator carrier means along a linear path. Rod rotating means turns the threaded rod member about a fixed axis of rotation. The indicator means is mounted to move with the indicator carrier means that is directed along the linear path upon rotation of the threaded rod member.

Where the workpiece support means moves in two directions along x and y coordinates, two threaded rod members are required. In some applications, relative vertical movement may require use of a third threaded rod member. The linear graduated means includes at least one elongated graduated member for each threaded rod member.

The rod rotating means includes a circumferential scale means having a circumferential zero point and a plurality of indicating marks spaced from the circumferential zero point and spaced with respect to each other for indicating a preselected amount of rod member rotations between adjacent circumferential marks. Generally, and as used with this invention, known circumferential scales measure linear movement of the workpiece support means in terms of thousandths of an inch.

The linear graduated means of the invention includes a linear zero point and a plurality of measuring or rotation counting marks spaced from the linear zero point. The measuring or rotation counting marks are laterally spaced with respect to each other along the linear scale or graduated means for a linear distance that corresponds and is equal to a complete rotation of the threaded rod member. The preselected amount of rod member rotation therefore designates a corresponding linear amount of movement of the indicator means along the linear graduated means.

The thread configuration in a specific embodiment includes a predetermined equal number of threads for each of a plurality of equal lineal distances measured along the longitudinal axis of the rod member. In a specific embodiment, each lineal distance is equal to an inch and the number of threads per lineal inch of the threaded rod member is selected from the group consisting of 5, 10, and 16. The number of threads per lineal inch may be any preselected number. The industry, however, has established various standards all of which apply in this invention.

The indicator means includes pointer means mounted to carrier means for pointing one at a time to the rotation counting marks on the linear graduated means. The workpiece is disposed on a workpiecce support means. Abutment means fixes the location of the workpiece on the workpiece support means.

The linear graduated means of a specific embodiment has two ends and a zero point at each end thereof. A set of the equally spaced rotation counting marks is laterally spaced from each of the end zero points. At least one elongated counting member includes the zero point at one end thereof and the set of equally spaced rotation counting means laterally spaced from the end zero point. More specifically, the counting member includes a zero point at each of its two ends and two parallel sets of graduated rotation counting marks each of which is laterally spaced from a respective zero point.

In another specific embodiment, there are three elongated counting members each having a zero point at one end thereof with a set of equally spaced rotation counting marks laterally spaced from each of the end zero points.

A specific feature is directed to linear graduated means mounted for adjusting the linear zero point to correspond to a predetermined setting point on a workpiece that is located on a workpiece support means by moving an elongated graduated member in a direction parallel to its longitudinal axis. The circumferential scale means includes zero point setting means, at least one rotatably mounted circumferential scale member having a circumferential zero point, and a fixed zero point indicator means mounted adjacent the circumferential scale member. The work operation means includes tool means, workpiece support means, and abutment means for fixing the location of the workpiece on the workpiece support means. The linear graduated means is mounted adjacent the linear path of the indicator means for indicating the distance of any relative movement between the workpiece and the tool means.

The workpiece support means may be mounted for movement along an x-axis and a y-axis by respective first and second threaded rod members. The linear graduated means therefore includes first and second elongated graduated elements bearing respective sets of equally spaced rotation counting marks laterally spaced from respective zero points for counting rotations of respective first and second threaded rod members.

The indicator means includes a respective first and second pointer means mounted for pointing one at a time to the rotation counting marks of the respective sets of equally spaced rotation counting marks carried by the first and second elongated graduated means. The workpiece support means includes a table member and a saddle member mounted to move with respect to each other along an x-axis and a y-axis. The tool means may be a milling machine, a drilling machine, a lathe, a mill-drill assembly, and the like.

In a further specific embodiment of the linear scale means, a delimited elongated member has a zero point at each end thereof and a set of equally spaced rotation counting marks disposed between the end zero points. The tool means includes an elongated cutting blade member for cutting segments from sheet material in a cutting operation. The workpiece setting means includes guide means having a workpiece abutting surface against which the sheet material is disposed during the cutting operation. The indicator means designates on the linear graduated means a lineal distance between the abutment surface and cutting blade and, therefore, the size of a segment being cut from the sheet material.

More specifically, the elongated cutting blade member has a straight cutting edge extending in a first direction for cutting segments from a sheet of material in a cutting operation. A first sheet abutting surface is located on a first side of the cutting edge and a second sheet abutting surface is located on a second side of the cutting edge opposite the first side.

The first sheet abutting surface is used to guide a juxtaposed sheet of material that is disposed in a direction transverse to the first direction of the cutting edge. The second sheet abutting surface limits movement of the sheet of material to a delimited distance past the cutting edge to define the measured size of the segment being cut from the sheet of material.

In a specific embodiment of a linear guide member, a first sheet abutting surface is adjacent the linear graduated means. An abutment member includes a second sheet abutting surface. The abutment member is adjustably mounted to the indicator carrier means for moving the abutment member in tandem with the indicator means when the indicator carrier means moves along the linear path upon rotation of the threaded rod member.

Another feature of the invention is directed to the material support means that includes flat plate means for supporting a sheet stock workpiece and indicator guide means for directing a measured amount of the workpiece toward the cutting means. The indicator guide means includes indicator means, indicator carrier means, and elongated linear graduated means. The indicator carrier means includes precision threaded rod means rotatably mounted to the frame means for moving the indicator means a predetermined amount along the linear graduated means for each rotation of the threaded rod means. The linear graduated means includes a plurality of rotation counting marks laterally spaced to designate the predetermined amount for each complete rotation of the threaded rod means from a zero linear starting point.

More specifically, the indicator carrier means includes rod rotating means for turning the threaded rod means about a fixed axis of rotation. The rod rotating means includes a circumferential scale having a zero circumferential point and a plurality of circumferential indicating marks spaced with respect to each other by a circumferential amount that designates a predetermined linear amount of movement of the indicator means along the linear graduated means.

In a specific embodiment, the circumferential amount of movement between spaced circumferential indicating marks on the circumferential scale measures an amount equal to one thousandths of an inch along the linear graduated means. The indicator means includes an indicating element that points to a particular location on the linear graduated means that bears a plurality of laterally spaced rotation counting marks. The space between linear rotation counting marks corresponds and is equal to a single complete rotation of the threaded rod means. Thus, the total number of rotation counting marks moved by the indicating element corresponds to the total number of rotations of the threaded measuring rod means. The indicating marks on the circumferential scale means then specifies the fractional amount of linear movement by the indicating element between rotation counting marks on the linear graduated means.

In other words, the circumferential scale means includes a plurality of circumferential marks for designating a fractional amount of a complete rotation between a pair of successive rotation counting marks upon a partial rotation of the threaded measuring rod means. Thus, the indicator means together with the circumference scale means designates on the linear graduated means a corresponding linear amount of relative movement between the workpiece and the tool for precision locating the workpiece on which a work operation is to be performed.

Regarding the specific handling of sheet material to be cut, the material support means includes guide means and abutment means. The guide means is on a first side of the cutting blade means for directing a measured amount of the sheet stock workpiece past the cutting blade. The abutment means is on a second side of the cutting blade means opposite the first side for limiting movement of the material past the cutting blade. The distance between the abutment means and cutting blade defines the measured amount of the material to be cut.

More specifically, the material guide means includes linear indicating means, guide carrier means, precision threaded rod means, and linear graduated means. The linear indicating means is mounted to the carrier guide means on the first side of the cutting blade means and the abutment means is mounted to the carrier guide means on the opposite second side of the cutting blade means. The precision threaded rod means is rotatably mounted to the frame means for moving the guide carrier means with the linear indicating means a selected distance along the linear graduated means. The linear indicating means and abutment means move in tandem when the threaded rod means turns about a fixed axis of rotation, which is coextensive with the longitudinal axis of the rod means.

Another feature is directed to guide carrier means that includes adjustment means mounted for variably setting the location of the abutment means with respect to the cutting blade means and the carrier guide means. The cutting blade means includes a blade member having a straight cutting edge extending in a direction perpendicular to the linear vertical path of movement for the carrier blade. The guide means includes a first material abutting surface that extends in a direction perpendicular to the cutting edge. The abutment means includes a second material abutting surface that extends in a direction parallel to the cutting edge.

The invention is also directed to a retrofit measuring assembly for use with various workpiece operation means. Tool means, at least one precision threaded rod member, and rod rotation means comprise the workpiece operation means. The tool means is effective to perform a work operation at a preselected location on a workpiece disposed on workpiece support means. The precision threaded rod member is rotatably mounted for relatively locating the workpiece with respect to the tool means. The rod rotation means is effective to rotate the threaded rod member about a longitudinal axis of the rod member.

The measuring assembly comprises carrier means, circumferential scale means, and linear graduated means. The indicator means is mounted to carrier means for moving relative to the linear graduated means along a linear path when the threaded rod member rotates. The circumferential scale means and linear graduated means operate as in all embodiments with respect to the indicator means.

The carrier means includes securing means for causing the indicator means to move with respect to the linear graduated means upon rotation of the threaded rod member. The linear graduated means is stationarily mounted with respect to the workpiece support means and includes a zero point at one end thereof. A set of equally spaced rotation counting marks is laterally spaced from the end zero point.

The assembly of the invention may be installed either as part of the original equipment built into a particular material working machine or as a retrofit measuring assembly that incorporates the various elements of the disclosed measuring system.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 5 is a front elevational view of the assembly of FIG. 2 with the cutting head handle shown extending in a direction perpendicular to the longitudinal axis of the frame structure;

FIG. 6 is a rear elevational view of the assembly of FIG. 2 with the cutting handle shown extending in a direction 180 degrees from the position shown in FIG. 5;

FIG. 7 is an exploded perspective view showing another embodiment of a measuring system of the invention;

FIG. 8 is an exploded perspective view of an embodiment of the cutting head assembly of the invention without a tension bar on its frame structure;

FIG. 12 is an elevational view showing the face of the x-axis linear graduated indicator assembly of FIGS. 9A and 10;

FIG. 13 is an elevational view showing the face of the y-axis linear graduated indicator of FIG. 11;

FIGS. 14, 15, 16, and 17 show rotation counting marks with respective indicia for use on respective linear graduated indicators used with 10-pitch, 5-pitch, 8-pitch, and 16-pitch drive screws, respectively;

DETAILED DESCRIPTION OF THE INVENTION

Figure 1:
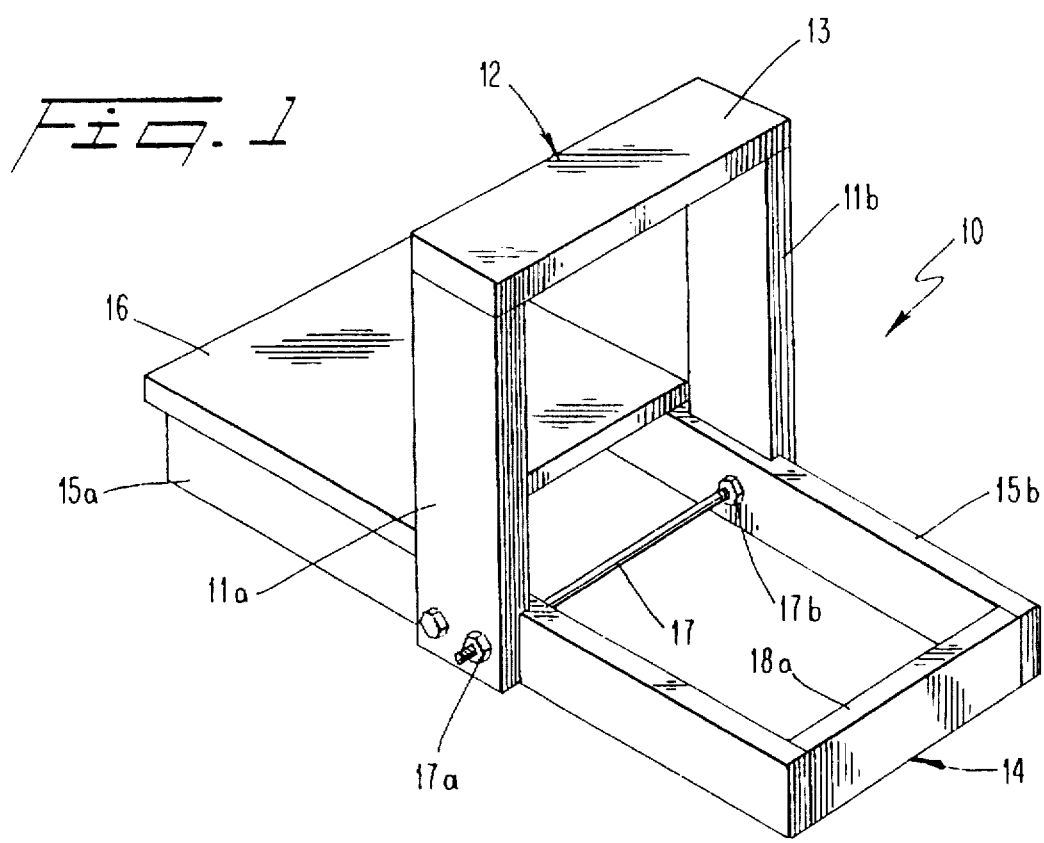
FIG. 1 is a perspective view of the cutting assembly frame structure of the invention without showing the novel measuring system and cutting blade carrier assembly for clarification.

In FIG. 1, the assembly, generally designated 10, includes a frame structure, generally designated 14, having side base frame elements 15a and 15b attached to end frame elements 18a and 18b (FIG. 7). Cutting head frame assembly, generally designated 12, includes top plate 13 connected to side elements 11a and 11b that are fixed to respective base frame elements 15a and 15b.

In the embodiment of FIGS. 2–8, two bolts 19 secure the bottom portion of each side frame element 11a and 11b to base frame members 15a and 15b. Drilled and tapped holes in frame elements 15a and 15b receive ⅜-16 bolt (⅜ of an inch diameter, 16 threads per inch) with two oversized holes drilled in cutting head frame elements 11a and 11b to allow adjustment during assembly of the cutting head frame apparatus. Tension bar 17 keeps the base side frame elements 15a and 15b from flexing under a heavy load on the cutting head and are generally sufficient for manually operating cutting head assemblies of the invention.

When a motor driven unit is used to move a cutting blade carrier head 20 up and down between side frame members 11a and 11b, however, a force of 10 thousand pounds or more might be exerted on the cutting head assembly 12. Consequently, base frame elements 15a and 15b could flex up to 3 or 4 thousandths of an inch causing a loss in downward force due to increased friction on the ends of cutting blade carrier head 20. Tension bar 17 provides added means for preventing such flexing of the frame assembly under these conditions.

The ⅜-16 threaded tension bar 17 extends through the two rear clearance holes in base frame elements 15a and 15b. Nuts secure tension bar 17 on the outside of cutting head side frame elements 11a and 11b and lock nuts fix tension bar 17 in place on the inside of base side frame elements 15a and 15b.

With tension bar 17, cutting head frame assembly 12 is first adjusted and bolted with two front bolts 19. Nuts 17a are then tightened on tension bar 17 creating an inward tension on base side frame elements 15a and 15b. Inside lock nuts 17b are then tightened to secure elements 11a and 11b to respective base frame members 15a and 15b. The holes in elements 11a and 11b are clearance holes. Use of tension bar 17 will also ensure a smoother operating unit when using manual force with cutting blade handle assembly 40 shown in FIGS. 2–8.

FIGS. 2–8 show a cutting head assembly 12 having a top frame plate 13 secured by bolts 13a to two laterally spaced tool carrier support frame structures 11a and 11b mounted to opposing sides of base frame elements 15a and 15b with bolts 19. Each frame structure 11a and 11b has a guide slot 21 that receives a respective outer end portion 22 of carrier body 20 having a longitudinal axis A that is perpendicular to frame structures 11a and 11b.

Each vertically disposed frame element 11a and 11b has a longitudinal axis 11c, an end portion lid fixedly secured to respective base frame elements 15a and 15b, and a top end portion fixedly secured to top frame element 13.

A recessed slot 21 extends parallel to longitudinal axis 11c of each elongated frame element 11a and 11b. Slot 21 has a depth that is less than the thickness of frame elements 11a and 11b, a width sufficient to contain an outer end portion 22 of carrier body 20, and an upper end opening to receive end portion 22 into recessed slot 21.

Pressure plate members 25 and 26 are located at each outer end portion 22 and include respective pressure bearing surfaces 25a and 26a contiguously disposed to an outer end surface of carrier body 20. Plate members 26 are fixedly secured by bolts 28 to respective frame elements 11a and 11b adjacent recessed slot 21. Plate members 26 apply pressure against a first surface of carrier body 20 in a direction perpendicular to its longitudinal axis A.

A plate member 25 is disposed in each recessed slot 21 of frame elements 11a and 11b. Bearing surface 25a applies pressure against an outer end surface of carrier body 20 in a direction parallel to its longitudinal axis A. Pushing bolts 27 urge pressure plate members 25 toward the end surfaces of carrier body 20. Once the pressure is evenly distributed along pressure plate 25, lock nuts 27a fix the pushing bolts 27 in a position to define a vertically disposed linear path for carrier body 20. Its longitudinal axis A is perpendicular to support frame elements 11a and 11b.

To assemble these parts, cutting head 20 (with blade 30 removed) is spaced within slots 21 of elements 11a and 11b, which are fixed to frame elements 15a and 15b, respectively. Without pressure plates 25 in place, the outer ends of cutting head 22 rest on one inch spacer blocks (not shown) that are placed on the top of each side frame element 15a and 15b. The spacer blocks keep cutting head 20 about an inch above and parallel to the top of frame elements 15a and 15b. Cutting head 20 is at a location where it would be in its lowest cutting position when cutting through sheet stock placed on the support bed 16.

The two rear pressure plates 26 are then loosely attached to frame elements 11a and 11b with bolts 28. A tightening mechanism such as a C-clamp is then used to draw each pressure plate 26 tightly one at a time against the back of cutting head 20. Once pressure bearing surface 26a is pushing tightly against outer end portion 22, bolts 28 are then firmly tightened to secure pressure plate 26. Thus, frame elements 11a and 11b are independently tightened to end portions 22 of cutting head 20 to make cutting blade carrier 20 tight from front to back in the side frame elements 11a and 11b. There is still play and a space between each respective outer end portion 22 and recessed slot 21.

A pressure plate 25 is then dropped into each space between the end faces of end portions 22 and the bottom of recessed slots 21. Pressure plates 25 slip fit into slots 21 to preclude movement in the slots front to back with respect to assembly 10. End plates 25 are disposed down to the top of the curved portion as shown.

Handle assembly, generally designated 40, includes a threaded screw 42 having a ½ inch diameter. Cutting head crank 44 has an opening slightly smaller than the ½ inch diameter screw 42 and press fits over the top end of screw 42. A hole is then drilled to receive compression pin 43 that extends transversely to hold screw 42 in cutting head crank 44.

Handle 46 slidingly fits into a slot across the top of crank head 44 as shown and is fixed in place by screw 47. Cutting head knob 48 is rotatably disposed about a threaded bolt 49 that is fixed in place by nuts 50 on opposing sides of handle 46 as shown. The other end of screw 42 is machined to a cone-shaped configuration to fit a correspondingly shaped rod seat 29 located in bracket recess 24 of carrier body 20. Therefore, upon clockwise rotation of screw 22 in this embodiment, as is structurally evident with the engaged cone-shaped rod end bearing surface of screw 22 and shaped rod seat 29, the full downward drive force of screw 22 exerted against rod seat 29 will be transmitted with substantially equal force directed outwardly toward the end portions of carrier body 20. In other words, the cone-shaped rod end bearing surface of screw 22 and cone-shaped rod seat 29 constitute means for exerting a full drive force against carrier body 20 to transmit a substantially equal force directed outwardly toward the two opposite end portions of carrier body 20.

Screw 42 is first rotated through the tapped opening 41 in the top frame plate 13. Once screw 42 extends at least an inch below plate 13, lock nut 39 is threaded onto the bottom of screw 42. Retriever bracket 23 next is placed onto screw 42 and adjustable bearing member 45 is then threaded to screw 42. Bearing member 45 has a sleeve portion that fits through the opening of bracket 23 and has an annular bearing surface. The annular shoulder portion annularly extends outwardly from the sleeve portion and sets the annular bearing surface against the inside surface around the opening of bracket 23.

Once the outer threaded end bracket assembly is complete, top plate member 13 is secured to the top ends of side elements 11a and 11b with screws 13a. Once in place, threaded screw 42 is rotated downwardly to lower bracket 23 over recess 24 until lower holes 23a in bracket flanges are registered with a corresponding opening through which a ¼ inch bolt fixes bracket 23 to carrier body 20. Rod seat 29 is about a quarter of an inch deep and slidingly fits the cone-shaped bottom of threaded screw 42. Grease maintains the sliding friction contact between rod bearing seat 29 and the cone-shaped end of screw 42.

The sleeve portion of bearing member 45 has machined flat surfaces on opposed top sides to fit a 9/16 inch wrench. The inside threaded bearing member 45 is then rotated with a wrench upwardly along screw 42 until there is a solid sliding contact between the shoulder bearing surface of bearing member 45 and the inside surface around the opening of bracket 23.

With bracket 23 connected to carrier body 20 and bearing member 45, when handle assembly 40 rotates screw 42 clockwise, the cone-shaped bottom of screw 42 pushes downwardly against rod seating surface 29 to move carrier body 20 downwardly within slots 21. To retrieve or retract carrier body 20, handle 40 rotates screw 42 in a counterclockwise rotation and the annular shoulder bearing surface of bearing member 45 pulls upwardly against bracket 23 to retrieve carrier body 20 upwardly within slots 21. The position of barrier element 45 is adjusted along screw 42 to completely eliminate any looseness which might cause backlash associated with the up and down movement of screw 42.

Once handle assembly 40 is attached to bracket 23 as described, screw 42 is rotated counterclockwise by an amount sufficient to place the spacer blocks on the top surface of carrier body 20, which is drawn upwardly until spacer blocks rest against the bottom of top carrier plate 13. Thus, cutting blade head 20 is exactly parallel to the flat bottom of top plate 13. Tightened pressure plates 26 fix the path of movement from front to back of the assembly as blade carrier body 20 moves in a vertical linear path. When cutting blade head 20 is drawn upwardly parallel to top frame plate 13 against spacer blocks (not shown), end pressure plates 25 are next to be adjusted. Cutting blade head 20 is centered with screw 42, which establishes precision accuracy for cutting blade 30 firmly tightened to the bottom of carrier body 20.

To adjust an end pressure plate 25, pusher bolts 27 have a flat machined surface contiguously disposed to its outwardly directed surface. The flattened end surface of bolts 27 fully bear against pressure plates 25. The two center pressure bolts 27 are first finger tightened at each end of carrier body 20. Center lock nut 27a is then tightened to maintain the position of center pressure bolt 27. Next the two top bolts 27 are finger tightened and lock nuts 27a are tightened as were the center bolts.

Before tightening the bottom of the three pushing bolts 27, crank handle 46 rotates screw 42 clockwise and carrier body 20 is moved downwardly to its lowermost position. Then the two bottom push bolts 27 are finger adjusted and corresponding lock nuts 27a are tightened.

This tightening procedure provides a floating relationship between the outer ends of carrier body 20 and bearing surfaces 25a of pressure plates 25. Regardless of whether the frame elements 11a and 11b are absolutely vertical, once pressure plates 25 are in place as described, the cutting blade carrier head 20 moves in an absolutely perpendicular line with respect to any material placed on support bed 16. This structural configuration produces an absolutely vertical displacement along a perpendicular linear path for cutting blade carrier 20 without having to precisely machine side frames 11a and 11b.

In this specific embodiment, slots 21 are ½ of an inch deep, and pressure plates 25 are ¼ of an inch thick. There is a 0.025 of an inch play to adjust cutting blade carrier 20 with adjusting bolts 27 in combination with pressure plates 25.

Once carrier body 20 is firmly fixed within a linear path established by tightened pusher bolts 27, bolts 31 firmly attach cutting blade 30 to the bottom of carrier body 20. Bed 16 includes a front cutting plate 32 that operates in conjunction with cutting blade 30. Both cutting plate 32 and cutting blade 30 are composed of hardened steel. Cutting edge plate 32 is one inch wide, ¼ of an inch thick, and 6 inches long. Both cutting blade 30 and plate 32 are precision ground.

Figure 9:
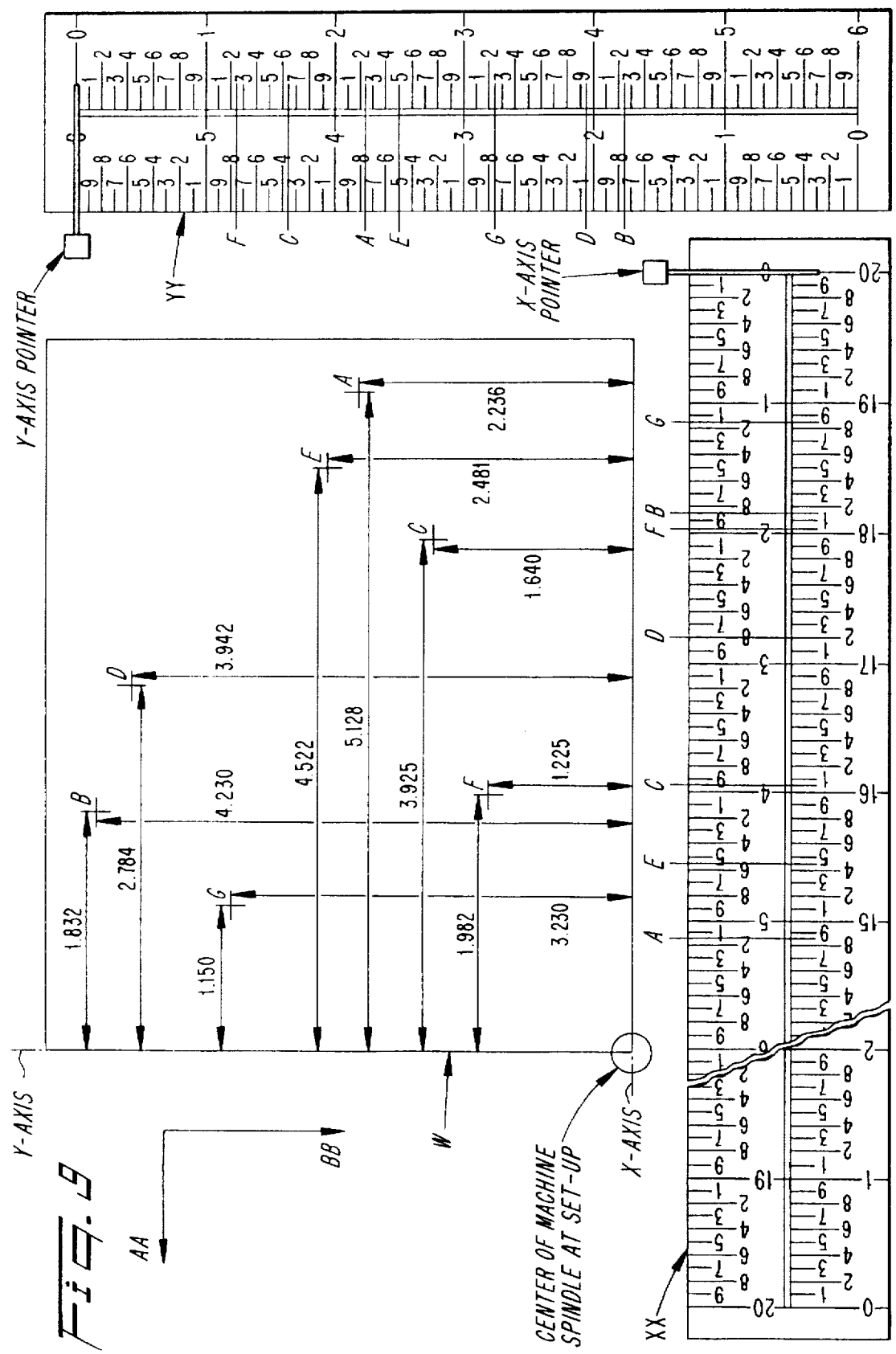
FIG. 9 is a schematic drawing showing a top plan view of a workpiece and the corresponding linear graduated indicators for showing how another embodiment of the measuring system of the invention operates.
Figure 10:
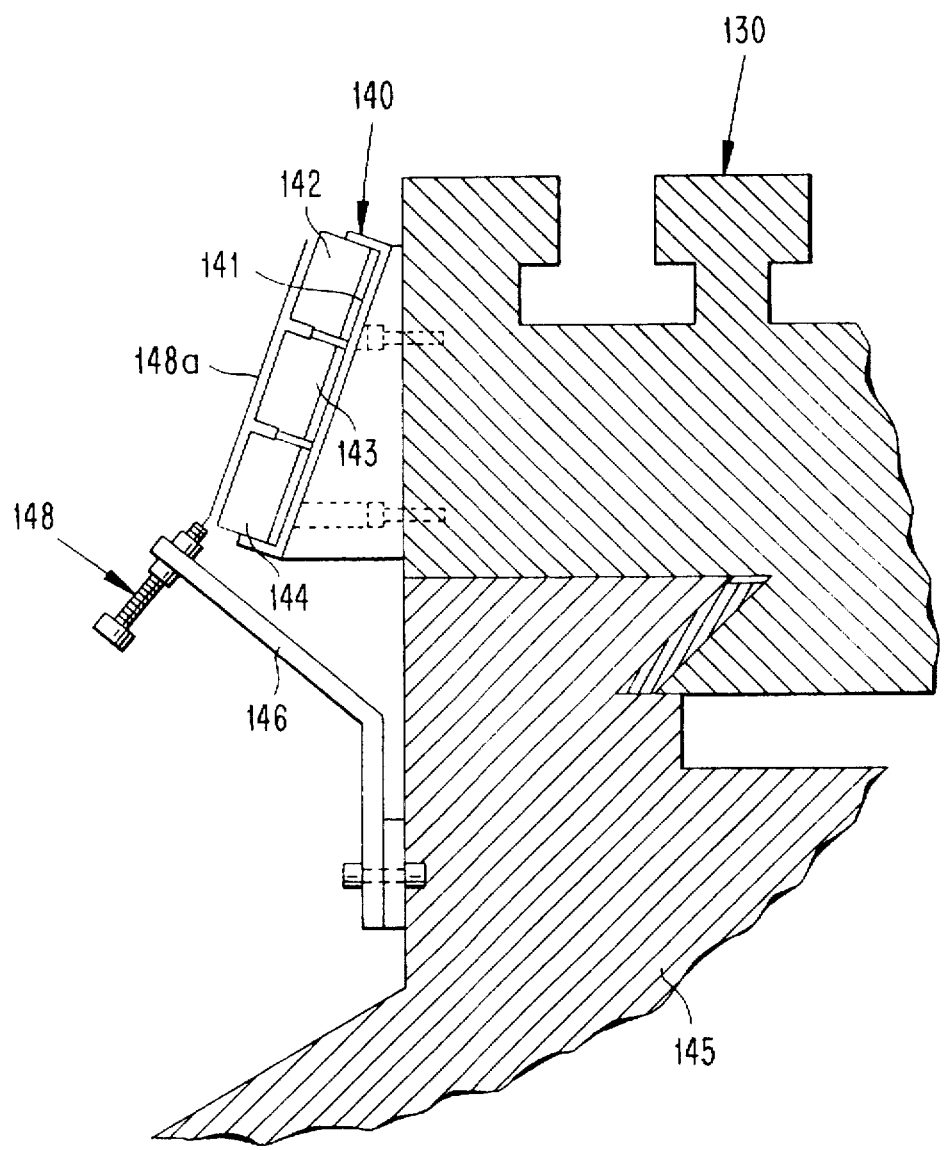
FIG. 10 is a fragmentary sectional view of the embodiment of FIG. 9A showing an end elevation of the x-axis linear indicator assembly of the invention.
Figure 11:
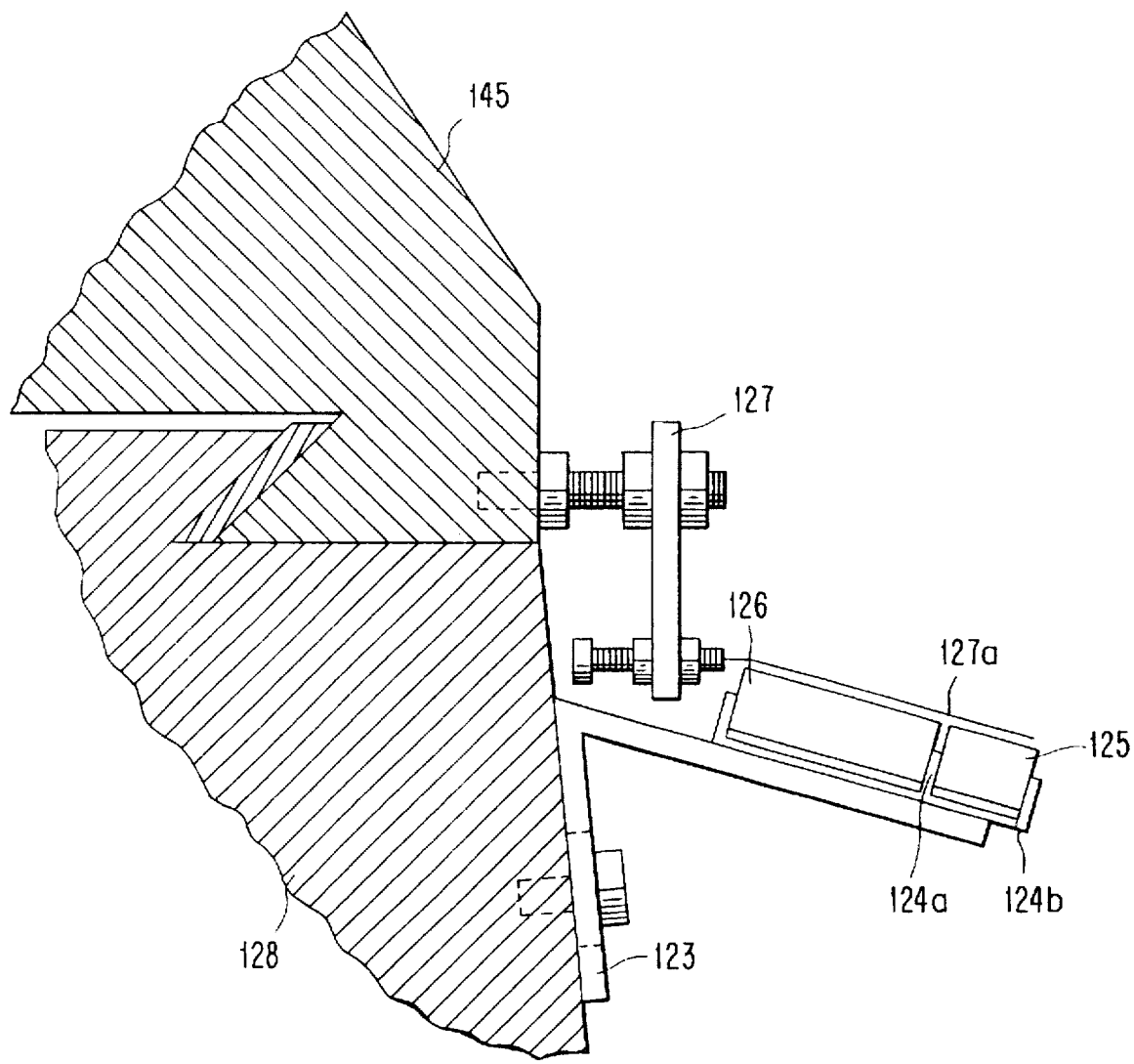
FIG. 11 is a fragmentary sectional view of FIG. 9A showing an end elevation of the y-axis linear graduated indicator of the invention.

Cutting blade 30 is designed to cut sheet material having a thickness of at least 1/16th of an inch. As shown in FIGS. 9 and 10, blade 30 has a front abutting surface 30a, a rear surface 30c tapered at 30° with respect to front surface 30a, and cutting edge 30b that slopes from one side to the other with a drop of 1/10 of an inch along its 6 inch length.

The cutting assembly of the invention is so designed to substantially eliminate any variance in effecting a cutting operation. The adjustments made during assembly of the cutting apparatus results in forward abutting surface 30a being in perfect sliding contact with cutter end contact edge 32a during a cutting operation.

Bolts 31 attach blade member 30 to blade carrier member 20 through five counter-sunk holes 31a. The tapered disposition of cutting blade edge 30b from one end of blade member 30 to the other produces a shearing effect between blade member 30 and straight contact edge 32a during a cutting stroke through the material being cut. The tapered disposition is formed by a drop of cutting edge 30b measured along 6 inches of cutting blade 30 as shown in FIG. 9 in a range of from about 1/10th to about 1/16th of an inch.

Forward abutting surface 30a is disposed at an angle of about 30 degrees with respect to rear tapered surface 30c. Both cutting blade surfaces 30a and 30c are precision ground with a surface grinder. End edge 30b is ground by hand to take off the extremely sharp point but further provides stability for cutting steel. At the same time, the quality of cut for edge 30b is maintained for softer materials such as flexible sheets of polyethylene, paper, cardstock, or rigid plastic material.

Precision Measuring System

The measuring system, generally designated 60, includes guide means for directing a measured amount of a sheet stock workpiece toward cutting blade 30. An indicator carrier arm 62 is fixedly mounted to a front traversing bar 64 and a rear traversing bar 66. A precision threaded drive screw 65 has 16 threads per inch. Therefore, every time there is a full rotation of screw 65, indicator carrier arm 62 moves exactly 1/16th of an inch. A circumferential scale 72 has a circumferential zero point and circumferential marks are spaced 0.001 of an inch with respect to each other around the circumferential dial. One sixteenth of an inch is 62.5 thousandths of an inch. One eighth of an inch is 125 thousandths. The distance between each mark on circumferential scale 72 represents one thousandths of an inch of linear movement of indicator carrier arm 62 along the length of precision threaded screw 65.

Measuring crank handle 74 is secured in a slot on the outer end of measuring crank 70 bearing circumferential scale 72. Crank knob 76 is rotatably mounted at the outer end of crank handle 74 for effecting rotation about the longitudinal axis of threaded screw 65, which is mounted to base frame element 15a with support brackets 61 and 63. Lock nuts 67 fix the adjustable bearing knob 68 at the rear end of screw 65, and the circumferential measuring crank 70 at the front of the measuring assembly.

Figure 2:
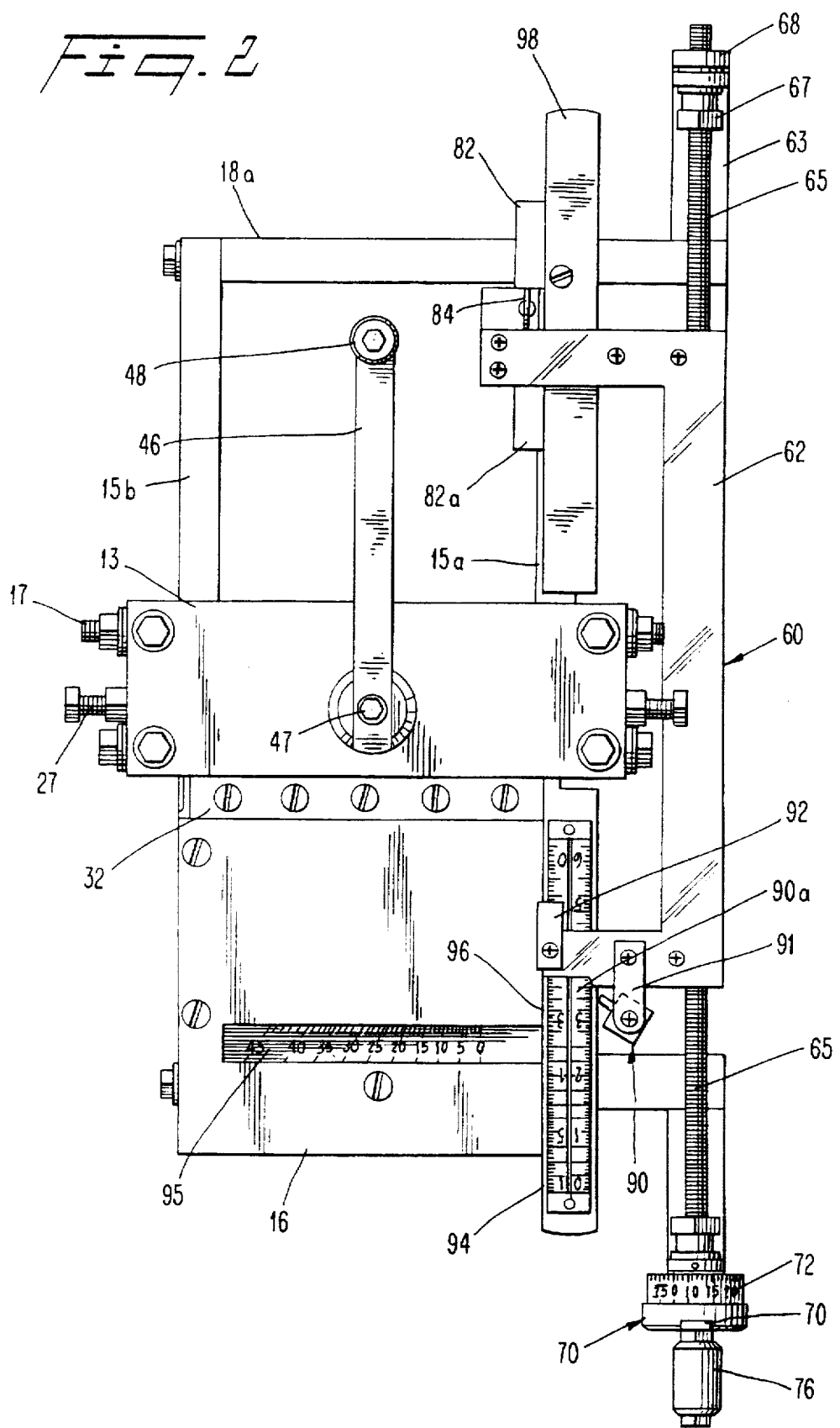
FIG. 2 is a top plan view of a first embodiment of a measuring and cutting assembly according to the invention with the cutting head handle shown extending parallel to the longitudinal axis of the frame structure.
Figure 3:
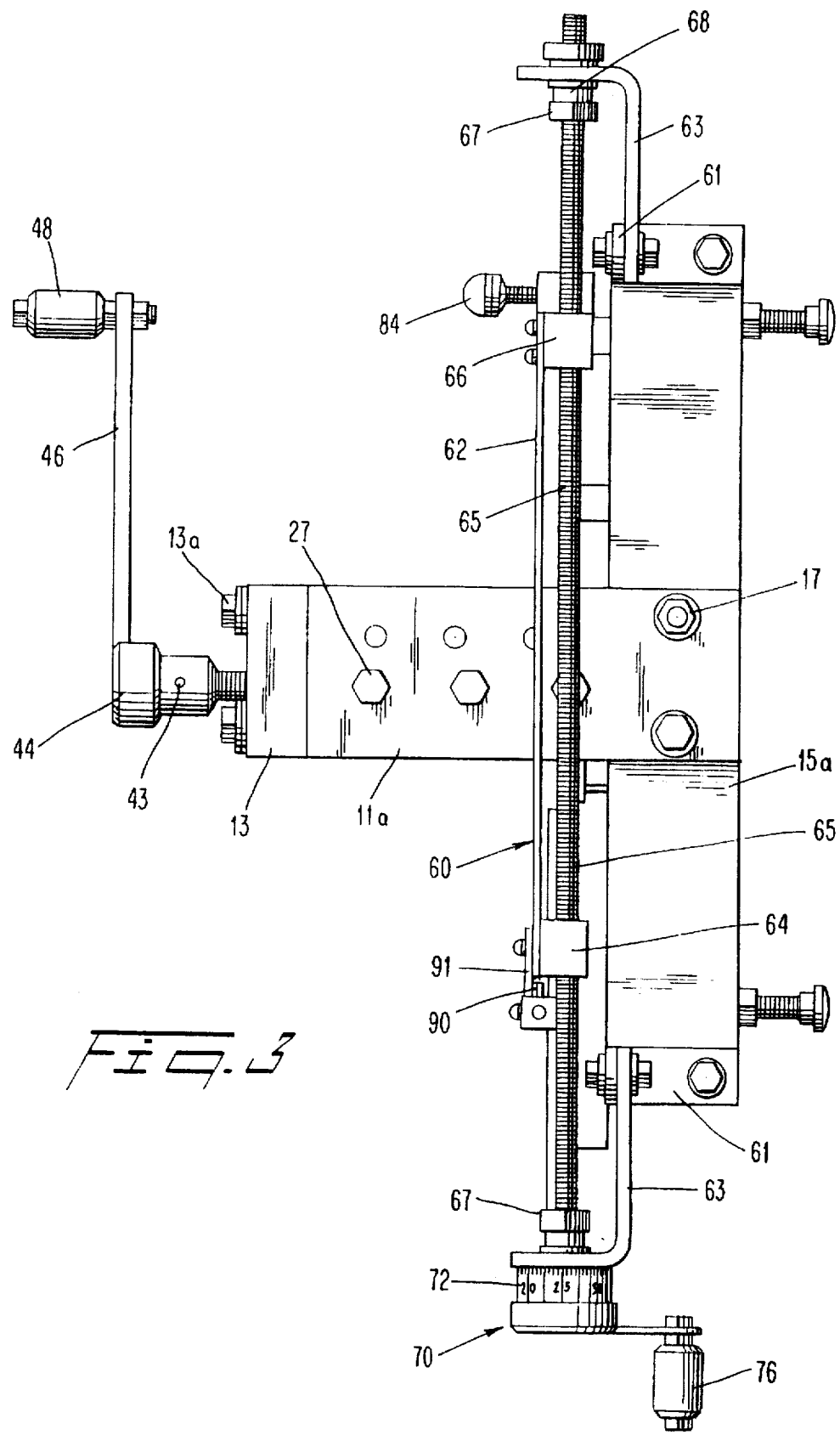
FIG. 3 is a right side elevational view of the assembly of FIG. 2.
Figure 4:
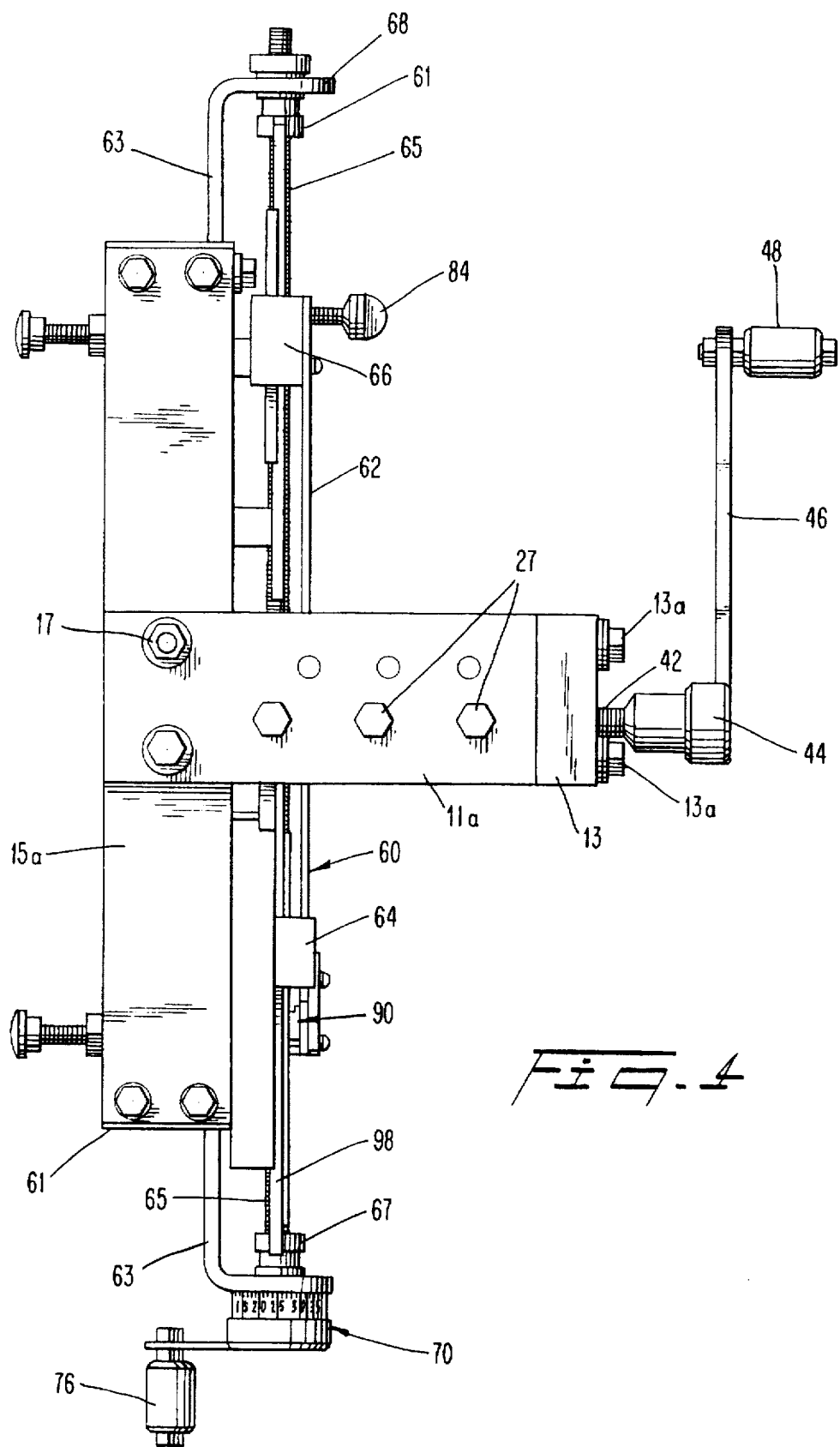
FIG. 4 is a left side elevational view of the assembly of FIG. 2.

In FIG. 2, indicating element 90 is mounted to the front L portion of indicator carrier member or element 62. Front stock abutment stop 92 is mounted to the outer end of the front L portion of carrier member 62. A double scale member 94 is mounted on the top of guide bar member 96. Double scale 94 includes a left-hand scale for measurements in front of cutting blade 30 with a zero point closest to the cutting blade and a right-hand scale for measurements behind cutting blade 30 with the zero point close to the outer end of double scale 94.

In this embodiment, double scale 94 is divided into 16ths of an inch. One sixteenth of an inch is the distance threaded screw 65 moves the wire indicating element 90a along the length of scale member 94 with each complete turn of crank 74 and threaded screw 65.

With this measuring arrangement, double scale 94 is not used to visually make measurements. It is used to pre-count, identify, and locate each complete turn of the dial on the measuring crank 70. For example, to set a known measuring system to cut a piece of flat stock 3.275 inches long, it will take 52 complete turns of the crank, plus 25 more thousandths. This would give the desired 3.275 of an inch measurement. It is very easy to lose track of counting the 52 crank rotations.

With the present invention, however, the double scale 94 has pre-counted and located the 52 turns at 3 and 1/4 inches on linear scale 94. The first course reading visually sets pointer 90a exactly at 3 and 1/4 inches. The circumferential scale 72 must be checked to make sure it is on zero. Crank 70 is then rotated 25 thousandths more as determined by circumferential scale 72. The cutting device is now set to make the required 3.275 of an inch cut.

If a sheet of stock material abuts against the end 82a of rear abutment member 82 before cutting, the 3.275 inch measurement is made from the zero point on the right-hand scale. The 3.275 inch measurement is made from the zero point on the left-hand scale if a sheet stock material is measured from the front abutment member 92 to the cutting edge 32a.

Using the measuring system of this invention, regardless of how long the scale 94 is or what size screw 65 is, any measurement can be visually located to within one turn of the crank without ever counting turns of the screw.

In this specific embodiment, the measuring crank circumferential scale 72 has three functions. With the zero point set on the notch at the top of the measuring device, scale 72 locates each complete turn of crank 70 and thus, screw 65. Secondly, the 62 and one half circumferential equal spaces between indicating marks around the circumference divides each complete rotation into 62 and one half thousandths of an inch because screw 62 has 16 threads to an inch. If screw 65 had 10 threads to an inch, then each revolution of crank 70 would produce a linear movement of 100 thousandths of an inch (1/10th of an inch) along linear scale 94.

The vital relationship existing in the measuring system of this invention is that the linear scale 94 includes a plurality of measuring or rotation counting marks laterally spaced with respect to each other by a predetermined amount that corresponds to a complete rotation of threaded rod 65. Said another way, each linearly spaced measuring or rotation counting mark measures a preselected distance equal to a complete rotation of drive screw 65. Moreover, the spaced circumferential marks on crank scale 72 divides each 1/16th of an inch on double scale 94 into 62.5 thousandths of an inch.

Stock Guide Assembly

Rear stock abutment member 82 is adjustably mounted in an abutment member holder 80 that is fixedly secured at the outer end of the rear L portion of indicator carrier element 62. Thumb tightening screw 84 is used to fix slidably disposed abutment member 82 in place within the edge groove or channel formed in abutment member holder 80.

One side of front guide element 96 includes a sheet stock abutment surface, which faces across the top surface of supporting bed 16. The other side of guide element 96 fits into the edge groove or channel of traversing block 64. Rear guide element 98 is fixedly mounted to base frame element 15a and fits into the edge groove or channel of rear traversing block 66.

The outer right-hand zero point of double scale 94 is used to measure the distance between cutting edge 32a and the outer end of rear abutment member 82. The left-hand side of the double scale 94 measures the distance from the front face of the front abutting surface 30a of the cutting blade 30 and the inner end of the front abutment member 92 or 92a as shown in FIGS. 2 and 7, respectively.

The indicating element 91 shown in FIG. 7 is fixed to indicating carrier arm 62 and is disposed along the center line of double scale 94 with outwardly directed wire elements 90b that designate a specific location on both sides of linear scale 94.

Five bolts fix the front cutting plate 32 to the top of the supporting bed 16. An angular measuring scale 95 on bed 16 is disposed perpendicular to guide element 96 and measures a particular angle with respect to the cutting edge 32a along an angle degree stop guide 100 that rotates about a fastening pivot member 101. Stop guide knob 102 located at the outer end of stop guide 100 facilitates its rotation about pivot member 101. Stop guide 100 pivots outwardly away from guide member 96 along angle degree measuring scale 95 and provides an abutting guide surface for cutting angles on contiguously placed sheet stock up to 45 degrees with respect to cutting edge 32a.

With the measuring system of the invention, the operator never needs to make a mistake. Each complete rotation of the threaded screw 65 is identified as a spaced measuring mark on the linear scale 94. Fine measurement is required only to determine how many thousandths of an inch the linear indicating elements 90a or 90b moves between the measuring marks on linear scale 94.

Backlash Prevented In Measuring System

By a combination of lock screws 67 on ⅜–16 precision threaded screw 65 and stabilizer or indicator carrier arm or element 62, backlash is eliminated from the disclosed measuring system. Backlash is common when moving a member having a threaded bore along a threaded rod member. The desired result is that when crank 76 is moved 5 circumferential marks to the right, indicating element 90a will move 5 thousandths of an inch. When crank 76 is moved back 5 marks to the left, indicating element 90a will move back to its original position. Any play between the threads of rod 65 and the bores of traversing members 64 and 66 whereby crank 76 is rotated without causing linear movement of element 90a is called backlash.

Any backlash would destroy the accuracy of the disclosed measuring system unless all measurements were made by turning the crank in only one direction. The existence of such play between threads on threaded screw 65 and the inside threaded bores of traversing members 64 and 66, however, would not work because double scale 94 measures in two directions.

Normally, when rotating a threaded screw clockwise into a threaded hole, any part threadingly engaged to the part moves in one direction along the threaded screw. Upon stopping and rotating the threaded screw counterclockwise without moving the member having a bore would destroy the accuracy of the scales on the measuring device.

Such backlash is prevented by the indicator carrier arm 62 being attached to front and rear traversing bars 64 and 66, which effect movement of carrier arm 62 along threaded drive screw 65. Front traversing bar 64 is attached to indicator arm 62 at a slight angle to 90 degrees with respect to the longitudinal axis of threaded measuring screw 65. This slight angle removes any play between the inner threads of front traversing bar 64 and outside threads of screw 65.

Any front to back play between bearing crank 70 or adjustable bearing 68 and brackets 63 would cause backlash in rotating screw 65. For this reason, lock nuts 67 are loosened and adjustable bearing 68 is turned to the right until all play is removed between threaded screw 65 and brackets 63. Lock nuts 67 are re-tightened once adjustment of bearing 68 is complete.

Adjustable bearing 68 also provides a second function in the measuring system of the invention. When locating measurements, it is necessary that crank 70 remains at any position just located. If crank 70 turns too freely, the weight of crank handle 76 could change this location. Adjustable bearing 68 allows the user to keep a desired pressure on crank 70 throughout the entire life of adjustable bearing 68.

Initial Setting of Measuring System

Once a workpiece is fixed to a workpiece supporting table of a precision drilling machine, it is first necessary to locate the workpiece edges from which all measurements in the system will be made. A 0.5 inch diameter cylindrical precision ground steel bar (edge setting bar) is placed in the drill chuck. A respective workpiece end or edge located in each of a first plane normal to the x-axis and a second plane normal to the y-axis is first set at a respective zero point on the respective elongated graduated indicator mounted parallel to the x-axis and y-axis directions of movement for the drilling machine workpiece support table. See FIG. 9 to see the setup of workpiece W with respect to indicators XX and YY, and x-axis and y-axis pointers.

The table hand crank is turned until the edge setting bar in the machine spindle is laterally spaced from the workpiece edge being set at a linear zero point along the x-axis. The machine handle that controls the vertical disposition of the spindle with respect to the workpiece is first turned to cause the spindle to carry the edge setting bar downwardly below the top surface of the workpiece. The spindle vertical control handle is then locked into this position to maintain the edge setting bar at a location to the side and below the surface of the workpiece. The manual table crank is then turned to cause the workpiece to move along the x-axis toward the outer side surface of the edge setting bar. On contact, the center of the spindle is exactly one half the diameter of the edge setting bar now touching the edge of the workpiece.

At this point in the edge setting procedure, the circumferential crank dial bearing a circumferential scale is set at a circumferential zero point in known manner. That is, a zero indicating mark fixedly secured adjacent the rotatable circumferential dial is aligned with the zero point on the circumferential scale. The spindle lock securing the spindle vertical disposition control handle is then loosened. The unlocked spindle then carries the edge setting bar upwardly clear of the workpiece so that the work table carrying the workpiece may now be moved to cause relative movement of the spindle inwardly from the workpiece edge. The table crank is turned to move the workpiece along the x-axis until the circumferential scale reads 0.250. The center of the machine spindle is now exactly over the edge of the workpiece.

The circumferential scale associated with the hand crank controlling movement of the workpiece along the x-axis is again loosened, reset at the circumferential zero point, and locked into position. The x-axis linear graduated indicator is now set to align a linear zero point with the x-axis pointer. The edge setting procedure is then repeated in the same manner for the y-axis movement of the workpiece.

Once each respective circumferential zero point and linear zero point for the x-axis and y-axis is set to the edge of the workpiece, they are not changed or relocated until the work to be performed is complete. Therefore, the precise relationship of the respective measurement reference edges of the workpiece with respect to the respective circumferential scales, linear graduated indicators, and pointer elements is maintained throughout the use of the precision system for designating the locations for work operations on a workpiece. The initial zero point setup is shown in FIG. 9.

Referring to FIGS. 14–17, as the circumferential dial rotates one complete turn from zero point to zero point on the circumferential scale, the counting marks on the corresponding linear indicator designate each of 0.100 inch for a 10-pitch threaded rod member or drive screw. The rotating drive screw moves the work support table and the associated linear indicator counts each complete rotation of the screw. For a 10-pitch screw, ten counting marks designate the ten screw rotations for each inch of linear movement.

A 5-pitch drive screw moves the work table 0.2 inch for each of the 5 rotations for every inch. FIG. 15 shows a linear indicator marked for each rotation by the numbers 1–4 and by the amount of each rotation 0.2, 0.4, 0.6, and 0.8 between each linear inch mark.

A complete circumferential scale for an 8-pitch and 16-pitch threaded rod member includes respective 0.125 and 0.625 inch rotation counting marks on the respective linear graduated indicators of FIGS. 16 and 17. Modelers usually work in terms of one sixteenth and one eighth inch measurements. Heavier equipment used by manufacturers such as milling and drilling machines generally work with measurements of 0.001 inch. No one until this invention has coordinated the pitch characteristics of a drive screw with a particular linear graduated rotation count indicator.

FIG. 9 shows the x-axis and y-axis pointer elements set at the zero points on their respective linear indicators XX and YY. Each respective pointer element moves in a linear direction along a linear elongated graduated indicator and records each of the rotation counting marks on the graduated indicator. Every time the zero point of the circumferential scale moves past the zero point marker fixed adjacent thereto, the respective pointer element will have moved along the linear graduated member exactly the preselected fraction of an inch related to the particular pitch of the drive screw.

The screw pitch, circumferential scale, and lineal graduated indicator are integrally related according to the invention. As the screw is rotated, the elongated graduated indicator counts, identifies, and locates each turn of the threaded drive screw and the circumferential scale designates the number of thousandths between the linear counting marks.

In effect, the elongated graduated indicator stores each rotation of the screw in memory for future positioning of workpiece W at a work operation location. As described for a 10-pitch threaded rod member, the following table shows the related distance for the total number of rotations of the circumferential scale that measures 100 thousandths of an inch for each rotation.

| No. of Rotations | Distance on Linear Scale (Inch) |
| --- | --- |
| 1 | 0.1 |
| 8 | 0.8 |
| 13 | 1.3 |
| 54 | 5.4 |
| 100 | 10.0 |
| 154 | 15.4 |
| 200 | 20.0 |

According to the invention, a 20 inch long x-axis graduated indicator is a one-dimensional straight line indicator effectively contains 20 thousand marks. A 10 inch long y-axis graduated element indicates 10 thousand marks disposed at right angles to the x-axis linear indicator. By combining the two elongated graduated members, a two-dimensional imaginary grid containing 200 million separate intersections is superimposed over the workpiece. Any one of the 200 million intersections can be quickly and easily located, and returned to time after time from any location on the workpiece without ever returning to the original edge of the workpiece.

Once the system of the invention is set up to measure from the edges of a workpiece, all possible measurements are made down to a resolution of 0.001 inch regardless of the thread pitch of the threaded screw or drive rod member. The work operation location on the workpiece is thus simply reached by quickly rotating the threaded drive screws to the appropriate spots on the x-axis and y-axis elongated graduated indicators without having to use additional visual aid means.

Specific Example

FIG. 9 shows an x-axis linear graduated element XX, a y-axis graduated indicator YY, respective pointer elements, and a workpiece W mounted to a work table (not shown) with dimensions for seven holes to be drilled in the workpiece. By centering the machine spindle over the edge of workpiece W for both x- and y-axes, the center of the machine spindle will be located at the corner of the grid structure, which is registered with the rectangular workpiece W in the specific embodiment.

A 10-pitch drive screw is rotated to move workpiece W. Related circumferential dials bearing the circumferential scales are first set on their respective zero point marks to correspond to the zero point settings of the x- and y-axes pointers on linear indicators XX and YY. Once set at their zero points, the respective circumferential scales are locked in place with the respective thumb screw in the known manner. This procedure is effected for both the x- and y-axes as discussed above. Table stops fix the limit of x-axis movement by the workpiece in a known manner.

In a milling or drilling machine, the tool spindle is stationary and the workpiece table moves along two axes. As shown in FIG. 9, when the work table moves in the direction of arrow AA, the spindle moves across the workpiece left to right. When the work table moves in the direction of arrow BB, the tool spindle moves in the opposite direction with respect to workpiece W. The use of double scales on linear graduated indicators XX and YY, allows measurements from any edge of the workpiece by using the appropriate end zero point on the respective linear graduated indicator.

All actual measuring is done with the precision threaded rod drive screws of the milling or drilling machine, the rotation count indicators, and the circumferential dials associated with each hand crank that rotates the threaded drive screws. The two linear graduated indicators XX and YY disposed parallel to the x- and y-axes simply pre-count, identify, and locate the number of rotations of the drive screws.

Referring more specifically to FIG. 9, hole A is 5.128 inch down the x-axis and 2.236 inch down the y-axis. The hand crank that moves workpiece W along the x-axis is rotated and 51 rotations (5.1) are counted on indicator XX just beyond five inches. Once the x-axis pointer is at 5.1, the respective circumferential scale is then referred to so that the crank can be turned 28 more thousandths of an inch past the circumferential zero point.

The hand crank for adjusting the workpiece along the y-axis is then rotated until the y-axis pointer is on the rotation counting mark 22 shown on the right hand side of linear indicator YY. Then the circumferential scale associated with that hand crank is rotated 36 more thousandths of an inch past the circumferential zero point on the circumferential scale. Hole A can now be drilled.

The next hole to drill requiring the least movement of the table would be hole E. In accord with the prior art procedure, it is now necessary to subtract the difference between the x-axis measurement for hole A and hole E to find the distance between those two holes. This requires a reversing of the direction to get to the x-axis location for hole E.

First backlash must be removed from the threaded rod member so that the circumferential dial can be reset to zero. If the rotation count is lost during this process, it is necessary to go all the way back until the table hits the table stop that locates the edge of workpiece W. Here, the backlash is removed, the respective circumferential scale is reset to zero, and 45 turns are then counted to get back to hole E. If this happened on the y-axis, there is no saddle stop locating the edge of the workpiece. Consequently, the center of the spindle 9 would have to be relocated at the edge of workpiece W and the count started over for the y-axis distance.

By contrast, to locate hole E from hole A with the measuring system of the invention, the hand crank for adjusting the x-axis location of the work table is turned until the x-axis pointer is on 4.4. The same crank is then turned back in an opposite direction until pointer is on 4.5. Now it is simply a matter of reading the circumferential scale on the dial and turning the crank 22 more thousandths of an inch.

The problem of backlash is completely removed by making all measurements in one direction only. In the workpiece in this example of FIG. 9, all measurements are made by turning the hand crank in a first rotational direction. When the hand cranks are reversed to go back to a new location, it is necessary to simply go one rotation of the drive screw beyond the new point, reverse the crank, and make the final measurement in the original direction. This procedure automatically removes any effects of backlash in the system.

To finish locating hole E, turn the y-axis hand crank until y-axis pointer is on 24 and the respective circumferential scale is on the circumferential zero point. Then turn the respective hand crank 81 more thousandths. Hole E can now be drilled. This shows how quickly and easily the remaining five holes on the workpiece can be located in any chosen order.

With the measuring assembly of this invention, the user need only to visually get the pointer close to any desired rotation counting mark on the linear rotation count indicator. The final locating of that mark is effected by turning the related crank until the circumferential dial is on the circumferential zero point. The dial is then used to locate any one of the fractional inch marks on the circumferential scale for precision determining the work operation location that exists between each rotation counting mark on the linear indicator.

Figure 9A:
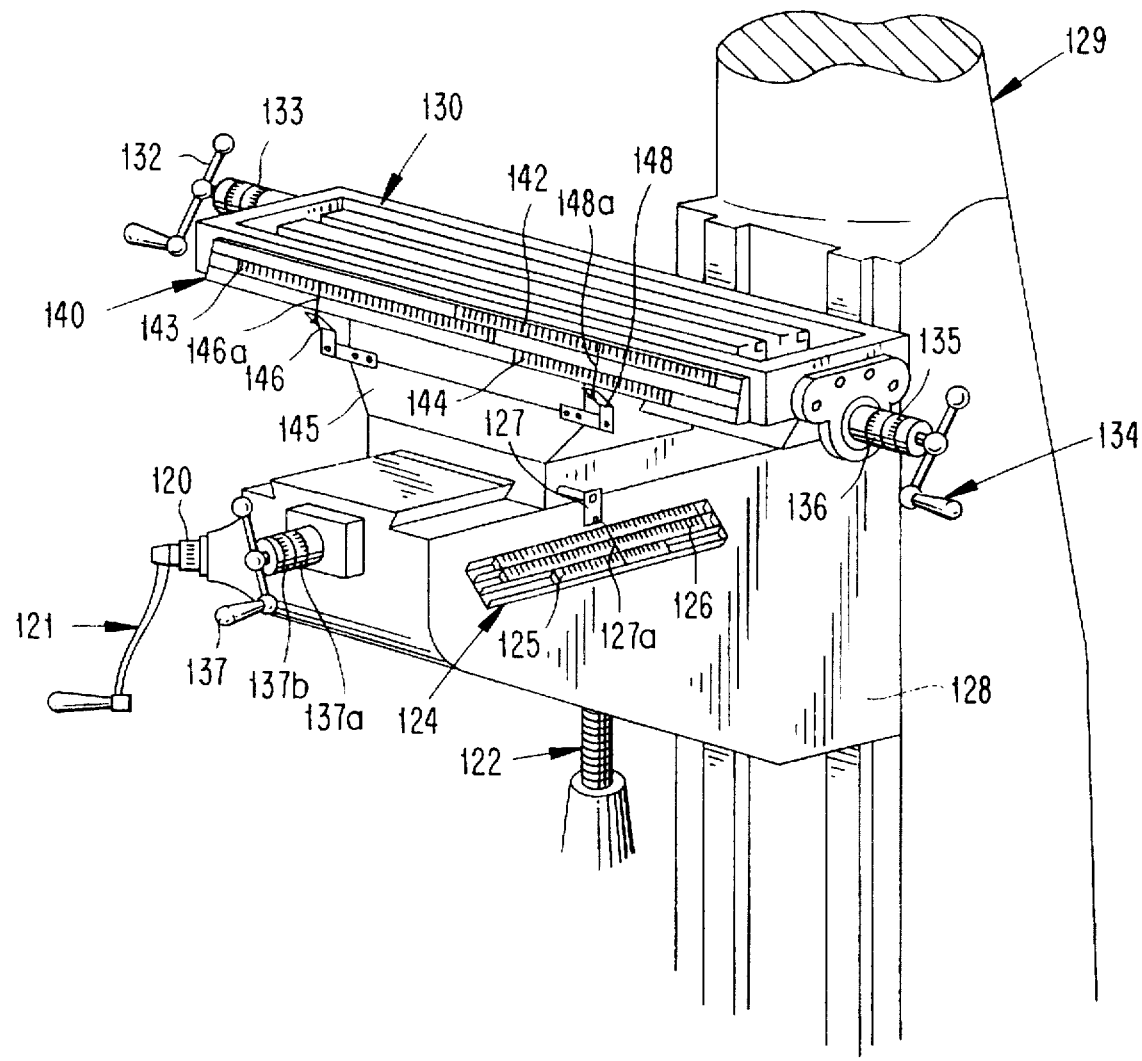
FIG. 9A shows a fragmentary perspective view of a milling machine that includes a further embodiment of the measuring system of the invention.

The embodiment of FIG. 9A is related to the fragmentary views in FIGS. 10, 11, 18, 19, and the x- and y-axes indicators of FIGS. 12 and 13. The milling machine, generally designated 129, comprises a work table 130, a saddle 145, and a knee 128.

Hand cranks 132 and 134 are used to rotate a 10-pitch drive screw (not shown) in the standard manner found on existing milling machines. Hand crank 137 drives saddle 145 in a direction perpendicular to the direction of movement of work table 130. Hand crank 121 vertically moves knee 128 carrying saddle 145 and work table 130 in a vertical disposition as determined by the rotating drive screw 122.

An indicator assembly generally designated 140, includes a frame member 141 having channels formed between upstanding wall members 140a. A primary indicator 142 is movably mounted along its longitudinal axis in the top channel, indicator 143 moves in a direction parallel to its longitudinal axis a second channel of frame member 141, and indicator 144 moves in the bottom or third channel of frame element 141.

With respect to the y-axis indicator assembly, generally designated 124, includes linear indicator 126 having a zero point at opposite ends thereof. Indicator 126 floats longitudinally within the wider channel between the upstanding wall members 124a of support element 124b. A bottom floating member 125 having a center zero point moves back and forth within its respective channel as shown.

The specific embodiments of indicator assemblies 140 and 124 are made of a magnetic material with the back of the floating indicators magnetized to maintain their floating position within their respective channel sections.

FIG. 10 shows pointer element 148a mounted to a threaded adjusting screw 148 that threadingly engages bracket 146. Bracket 146 is fixedly attached to saddle 145 and support element 141 carrying floating indicators 142, 143, and 144 is fixedly attached to work table 130. The floating indicator assembly 140, and pointer element 148a operate in conjunction with the crank members 132 and 134, which carry circumferential scales 133, and 135, 136, respectively.

Figure 18:
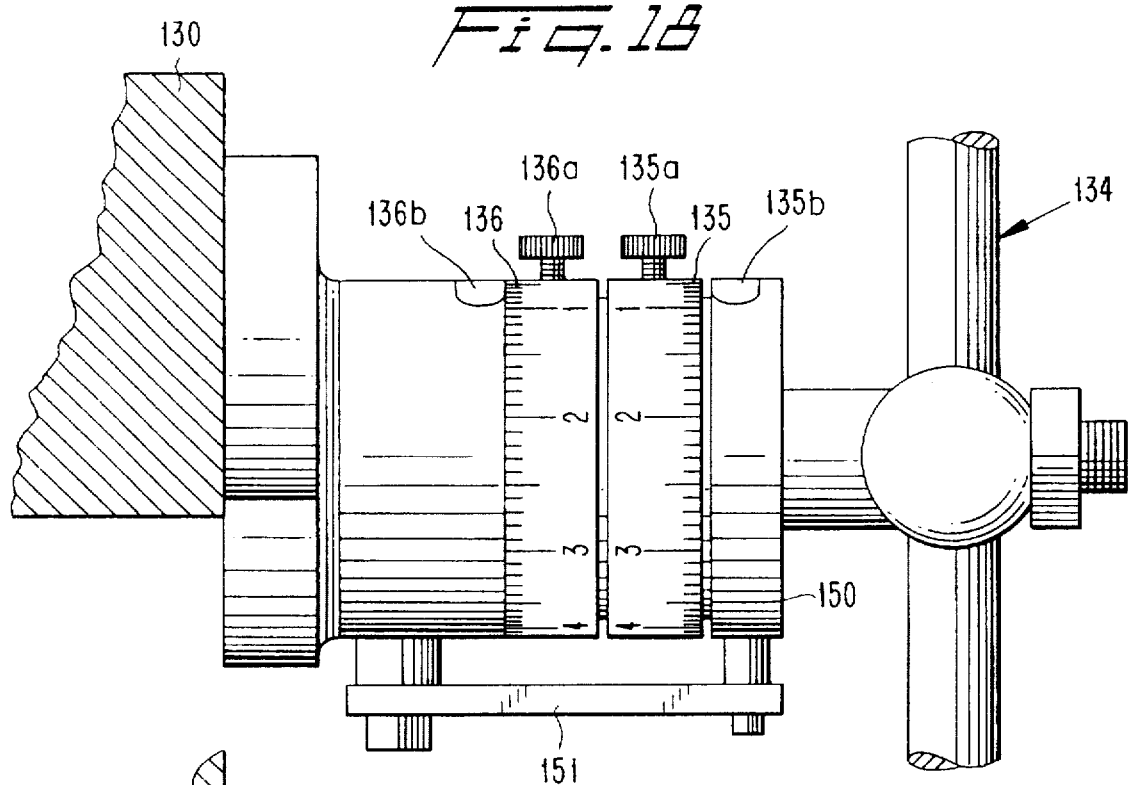
FIG. 18 is a fragmentary sectional view of the milling machine of FIG. 9A showing a side elevation of a double circumferential dial system of the invention.
Figure 19:
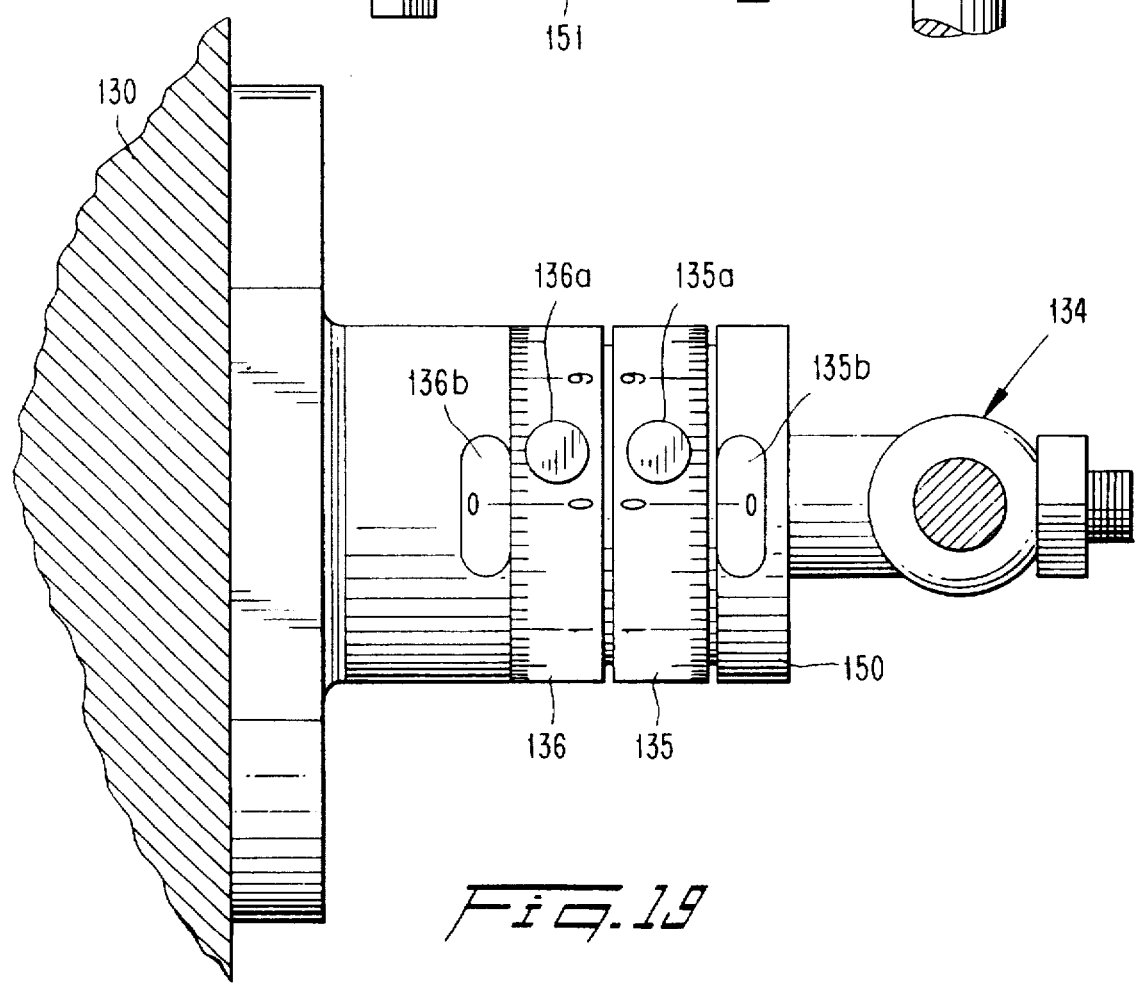
FIG. 19 is a fragmentary sectional view showing a top plan of the dial system shown in FIG. 18.

FIGS. 18 and 19 show details of double circumferential scales 135 and 136 that operate the crank handle 134. The second circumferential dial carrying scale 135 is mounted to a hub member 150 mounted to bracket 151. Thumb screws 135a and 136a operate to fix respective circumferential scales 135 and 136 to the rotating member turned by hand crank 134. The structure of thumb screw 136a and circumferential dial is found in all milling machines and includes a fixed zero mark indicator 136b mounted adjacent circumferential scale 136. In the embodiment of FIGS. 18 and 19, a second zero point marker 135b is fixedly secured to hub portion 150 adjacent circumferential scale 135.

In operation, the edge of a workpiece mounted on the top of work table 130 would first be found and zero element 148a registered with the linear zero point on indicator 142 using the methodology as discussed above. At the other end of the workpiece, hand crank 132 sets circumferential scale 133 at a circumferential zero point with the pointer element 146a located on the zero point for linear indicator 143 at the other edge of the workpiece.

Third floating indicator 144 operates with second circumferential scale 135 rotated by hand crank 134 as shown in FIGS. 18 and 19. The linear zero point of indicator 144 is at its center as shown. Primary pointer 148a now is aligned with the center linear zero point indicator 144.

Once set up, indicator 144 is then used to make measurements from a first work operation location such as a first hole to a second hole, which is to be spaced a particular distance from the first location. Primary circumferential dial 136 is never changed and remains a perfect reference point. However, the second measurement is made from the linear zero point located at the first hole to the next x-axis location found along indicator 144 by turning crank 134 after the second circumferential scale 135 has been set at its circumferential zero point. Indicator assembly 140 is thus capable of locating three separate locations using each of the three floating linear indicators 142, 143, and 144 in concert with the cranks 132 and 134, which carry respective circumferential scales 133, 135, and 136. Each measurement between the various work locations is effected as described above.

When the workpiece requires several measurements, it is possible to make specific use of the related circumferential scales, linear indicators, and hand cranks so that a multiple of work locations can be very quickly determined for effecting several work operations in a very short time. With indicator assembly 140, it is possible to set up a zero point at both ends of the workpiece with a third zero point being coordinated with each of those end points by using floating member 144 and second circumferential scale 135. With this double configuration, it is possible to make measurements in two different directions along the x-axis travelled by work table 130.

The y-axis assembly includes bracket 123 fixedly mounted to knee 128 of the milling machine. Pointer element 127a is first set at the zero point on linear indicator 126 once the respective circumferential scale 137a is located at the circumferential zero point. Circumferential scale 137b operates with floating indicator 125, which has a center linear zero point. Crank handle 137 moves saddle 145 along the y-axis in this particular embodiment. Bracket 127 is fixedly mounted on saddle 145 and measures the linear amount of movement from the y-edge of a workpiece mounted on table 130.

Crank handle 121 carries circumferential scale 120 to measure z-axis movement along a linear indicator (not shown) preferably mounted on the opposite side of the milling machine shown in FIG. 9A so that it can be viewed when rotating crank 121. It is not necessary to show this because the manner of operation in the vertical z-axis, is the same as has been described throughout this disclosure.

With the measuring system of this invention, the same basic speed and accuracy can be achieved in locating work locations on a workpiece as is possible with an electronic digital readout system. Thus, such accuracy is attainable therefore at a much lower cost and is readily available now to anyone who would desire to increase their accuracy and efficiency in locating and effecting work operations on a workpiece.

Any workpiece is fixed to a work table in a standard well known manner using an abutment means for fixing its location first before locating the edge locations along the x- and y-axes.

While the precision measuring apparatus for locating workpieces for work operations has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A measuring assembly for precision locating a workpiece with respect to work operation means for performing work at a preselected location on the workpiece, said assembly comprising:
   a) indicator means and at least one precision threaded rod member including a preselected thread configuration having a predetermined thread pitch along the rod member which is rotatably mounted in said assembly for effecting movement of said indicator means along a linear path adjacent said work operation means when the threaded rod member rotates,
   b) rod rotation means for rotating the threaded rod member about a longitudinal axis of the rod member to move said indicator means along said linear path,
   c) circumferential scale means mounted to said rod rotation means to rotate with the threaded rod member and rod rotation means for indicating a preselected fractional amount of a complete rotation of the threaded rod member about said longitudinal axis, and
   d) linear graduated means for indicating a corresponding predetermined linear distance of each complete rotation of the threaded rod member adjacent said linear path with said indicator means when the threaded rod member rotates.
   e) said linear graduated means mounted adjacent said work operation means and having a plurality of successive rotation counting marks laterally spaced with respect to each other by said predetermined linear distance equal to an amount of movement of the indicator means from one successive rotation counting mark to the next rotation counting mark along said linear path upon a complete rotation of the threaded rod member,
   f) said circumferential scale means including a plurality of circumferential marks for designating a said fractional amount of a complete rotation between a pair of successive said rotation counting marks upon a partial rotation of the threaded rod member.

2. An assembly as defined in claim 1 wherein said thread configuration includes a predetermined equal number of threads for each of a plurality of equal lineal distances measured along the longitudinal axis of the rod member.

3. An assembly as defined in claim 2 wherein
   each said lineal distance is equal to an inch, and
   the number of threads is selected from the group consisting of 5, 8, 10, and 16.

4. An assembly as defined in claim 1 wherein
   said circumferential scale means includes a circumferential zero point and the circumferential marks spaced from the circumferential zero point and successive circumferential marks are equally spaced with respect to each other for indicating said fractional amount of a complete rotation of the threaded rod member,
   said fractional amount of a complete rotation of the threaded rod member being effective to designate a linear measurement between the rotation counting marks disposed along the linear graduated means when the assembly is in use.

5. An assembly as defined in claim 1 wherein
   the workpiece operation means includes workpiece support means which includes abutment means for fixing the location of the workpiece on the workpiece support means.

6. An assembly as defined in claim 1 wherein
   said linear graduated means includes a linear zero point and the rotation counting marks are spaced from the linear zero point and successive rotation counting marks are equally spaced with respect to each other for indicating said predetermined linear distances corresponding to complete rotations of the threaded rod member.

7. An assembly as defined in claim 1 wherein
   said indicator means includes indicator carrier means and pointer means mounted to said indicator carrier means for pointing one at a time to the rotation counting marks on the linear graduated means.

8. An assembly as defined in claim 1 wherein
   said linear graduated means has two ends and a zero point at each end thereof, and
   a set of the equally spaced rotation counting marks is laterally spaced from each of the end zero points.

9. An assembly as defined in claim 1 wherein
   said linear graduated means includes a zero point at one end thereof and a set of equally spaced rotation counting marks laterally spaced from the end zero point.

10. An assembly as defined in claim 9 wherein said linear graduated means includes at least one elongated counting member with the zero point at one end thereof and the set of equally spaced rotation counting marks laterally spaced from said end zero point.

11. An assembly as defined in claim 10 wherein said counting member includes two ends with a zero point at each of the ends and two parallel sets of graduated rotation counting marks, each of the two sets of rotation counting marks being laterally spaced from a respective zero point.

12. An assembly as defined in claim 10 wherein there are three elongated counting members each having a zero point at one end thereof with a set of equally spaced rotation counting marks being laterally spaced from each said end zero point.

13. An assembly as defined in claim 1 wherein said linear graduated means includes a linear zero point and the rotation counting marks are spaced from the linear zero point and successive rotation counting marks are equally spaced with respect to each other for indicating said predetermined linear distances corresponding to complete rotations of the threaded rod member, and said circumferential scale means includes a zero point setting means, at least one circumferential scale member mounted to said rod rotation means and having a circumferential zero point, and a fixed zero point indicator means mounted adjacent the circumferential scale member.

14. An assembly as defined in claim 13 wherein said work operation means includes tool means, workpiece support means, and abutment means disposed adjacent said workpiece support means for fixing the workpiece at a location on the workpiece support means, said workpiece support means being disposed adjacent said tool means for supporting a workpiece upon which the tool means may operate, the linear graduated means is mounted adjacent said linear path of the indicator means for indicating a measured distance of any relative movement between the workpiece and the tool means.

15. An assembly as defined in claim 14 wherein said tool means includes cutting means for removing an amount of material from said workpiece supported by said workpiece support means during a work operation, said abutment means includes workpiece abutting surface means disposed adjacent said linear path and contacting said workpiece during said work operation, said indicator means together with said circumferential scale means designates on the linear graduated means a measured size segment being cut from the workpiece.

16. An assembly as defined in claim 14 wherein said linear graduated means includes a delimited graduated member having a zero point at each end thereof and a set of equally spaced rotation counting marks disposed between the end zero points.

17. An assembly as defined in claim 14 wherein said tool means includes an elongated cutting blade member having a straight cutting edge extending in a first direction for cutting a segment from a sheet of material supported by said workpiece support means during a cutting operation, said abutment means includes a first sheet abutting surface located on a first side of said cutting edge and a second sheet abutting surface located on a second side of said cutting edge opposite said first side, said first sheet abutting surface is located on first guide element means and is effective to guide a juxtaposed sheet of material in a direction transverse to said first direction of the cutting edge, and said second sheet abutting surface limits movement of said sheet of material past said cutting edge to define a measured size of the segment being cut from the sheet of material.

18. An assembly as defined in claim 17 wherein said first guide element means carries said linear graduated means and said first sheet abutting surface is adjacent the linear graduated means, and said second sheet abutting surface is located on an abutment member that is adjustably mounted to indicator carrier means for moving the abutment member in tandem with the indicator means when the indicator carrier means moves along the linear path upon rotation of the threaded rod member.

19. (Amended) An assembly as defined in claim 14 wherein said workpiece support means is mounted to be moved along an x-axis and a y-axis by respective first and second threaded rod members, said linear graduated means includes first and second elongated means bearing respective sets of equally spaced rotation counting marks laterally spaced from respective zero points for counting rotations of the respective first and second threaded rod members, and said indicator means includes respective first and second pointer means mounted for pointing one at a time to the rotation counting marks of the respective sets of equally spaced rotation counting marks carried by the first and second elongated means.

20. An assembly as defined in claim 19 wherein said workpiece support means includes a table member and a saddle member mounted to move with respect to each other along a respective x-axis and y-axis.

21. An assembly as defined in claim 19 wherein said tool means is a milling machine.

22. An assembly as defined in claim 19 wherein said tool means is a drilling machine.

23. An assembly as defined in claim 19 wherein said tool means is a lathe.

24. A retrofit measuring assembly for use with workpiece operation means including tool means, at least one precision threaded rod member, and rod rotation means, said tool means being effective to perform work at a preselected location on a workpiece disposed on workpiece support means, said precision threaded rod member being rotatably mounted for relatively locating the workpiece with respect to the tool means, said rod rotation means being effective to rotate the threaded rod member about a longitudinal axis of the rod member, said measuring assembly comprising:

a) linear graduated means and carrier means for mounting indicator means to move relative to said linear graduated means along a linear path when the threaded rod member rotates, b) circumferential scale means mounted to said rod rotation means to rotate with the threaded member and rod rotation means for indicating a preselected fractional amount of a complete rotation of the threaded rod member about said longitudinal axis, c) said linear graduated means including a plurality of successive rotation counting marks laterally spaced with respect to each other by a predetermined linear distance, d) said linear distance being equal to an amount of movement of the indicator means from one successive rotation counting mark to the next rotating counting mark along said linear path upon a complete rotation of the threaded rod member,
e) said circumferential scale means including a plurality of circumferential marks for designating a said fractional amount of a complete rotation between a pair of successive said rotation counting marks upon a partial rotation of the threaded rod member.

25. An assembly as defined in claim 24 wherein
said carrier means includes securing means for mounting said indicator means to move with respect to said linear graduated means upon rotation of said threaded rod member,
said linear graduated means being stationarily mounted with respect to the workpiece support means.

26. An assembly as defined in claim 24 wherein
said linear graduated means includes a zero point at one end thereof and a set of equally spaced rotation counting marks laterally spaced from the end zero point.

27. An assembly as defined in claim 24 wherein
said linear graduated means has two ends and a zero point at each end thereof, and
a set of the equally spaced rotation counting marks is laterally spaced from each of the end zero points.

28. An assembly as defined in claim 24 wherein
said circumferential means includes two rotatably mounted circumferential scale members having a circumferential zero point, a fixed zero point indication means mounted adjacent the circumferential scale member, and zero point setting means for setting the circumferential zero points of the circumferential scale members with respect to the fixed zero point indication means.

29. An assembly as defined in claim 24 wherein
said linear graduated means includes at least one elongated counting member with a zero point at one end thereof and the set of equally spaced rotation counting marks laterally spaced from said end zero point.

30. An assembly as defined in claim 29 wherein
said counting member includes two ends with zero points at each of the ends and two parallel sets of graduated rotation counting marks,
each of the two sets of rotation counting marks being laterally spaced from a respective zero point.

31. An assembly as defined in claim 29 wherein
there are three elongated counting members each having zero points at one end thereof with a set of equally spaced rotation counting marks being laterally spaced from each said end zero point.

32. An assembly as defined in claim 24 wherein
said workpiece support means is mounted to be moved along an x-axis and a y-axis by respective first and second threaded rod members,
said linear graduated means includes first and second elongated means each having a zero point at opposite ends thereof and bearing respective sets of equally spaced rotation counting marks laterally spaced from respective zero points for counting rotations of the respective first and second threaded rod members, and
said indicator means includes respective first and second pointer means mounted for pointing one at a time to the rotation counting marks of the respective sets of equally spaced rotation counting marks carried by the first and second elongated means.

33. An assembly as defined in claim 32 wherein
said workpiece support means includes a table member and a saddle member mounted to move with respect to each other along a respective x-axis and y-axis.

34. An assembly as defined in claim 32 wherein
said tool means is a milling machine.

35. An assembly as defined in claim 32 wherein
said tool means is a drilling machine.

36. An assembly as defined in claim 32 wherein
said tool means is a lathe.

37. An assembly as defined in claim 24 wherein
said linear graduated means includes a linear zero point and the rotation counting marks are spaced from the linear zero point and equally spaced with respect to each other for indicating said predetermined linear distances corresponding to complete rotations of the threaded rod member,
said linear graduated means is mounted for adjusting the linear zero point to correspond with a predetermined location on the workpiece located on a workpiece support means, and
said circumferential scale means includes a zero point setting means, at least one rotatably mounted circumferential scale member having a circumferential zero point, and a fixed zero point indicator means mounted adjacent the circumferential scale member.

38. An assembly as defined in claim 37 wherein
said workpiece operation means includes abutment means for fixing the location of the workpiece on the workpiece support means, and
said linear graduated means is mounted adjacent said linear path of the indicator means for indicating the distance of any relative movement between the workpiece and the tool means.

39. In a structural combination of frame means, workpiece support means, and tool means for performing a work operation on a workpiece disposed on the workpiece support means, a precision measuring assembly comprising:
a) workpiece setting means for precision locating the workpiece with respect to the tool means for performing said work operation,
b) said workpiece setting means including linear scale means, indicator means, indicator carrier means, and precision threaded rod means,
c) said threaded rod means having at least one threaded rod member rotatably mounted for moving the indicator carrier means along a linear path, and
d) rod rotating means for rotating said threaded rod member about a fixed axis of rotation,
e) said indicator means being mounted to said indicator carrier means for moving the indicator means along said linear scale means when the indicator carrier means moves along the linear path upon rotation of the threaded rod member,
f) said rod rotating means includes circumferential scale means having a circumferential zero point and a plurality of circumferential marks spaced from the circumferential zero point and successive circumferential marks are equally spaced with respect to each other for indicating a fractional amount of a complete rotation of said threaded rod member,
g) said linear scale means includes a linear zero point and a plurality of rotation counting marks spaced from the linear zero point and successive rotation counting marks are equally spaced with respect to each other along the linear scale means for indicating predetermined linear distances that correspond to complete rotations of the threaded rod member, i) said indicator means together with said circumferential scale means designates a corresponding linear amount of relative movement between the workpiece and said tool means for precision locating the workpiece to have said work operation performed on the workpiece means.

40. The combination as defined in claim 39 wherein said linear scale means includes a delimited scale member having a zero point at each end thereof and a set of said equally spaced rotation counting marks disposed between the end zero points.

41. The combination as defined in claim 39 wherein said tool means includes an elongated cutting blade member for cutting segments from a workpiece in a cutting operation, said workpiece setting means includes workpiece abutting surface means against which the workpiece is disposed during the cutting operation, said indicator means designates on the linear scale means a measured size of a segment being cut from the workpiece.

42. The combination as defined in claim 39 wherein said tool means includes an elongated cutting blade member having a straight cutting edge extending in a first direction for cutting segments from a workpiece in a cutting operation, said workpiece setting means includes a first workpiece abutting surface located on a first side of the cutting edge and a second workpiece abutting surface located on a second side of the cutting edge opposite said first side, said first workpiece abutting surface guides a juxtaposed workpiece in a direction transverse to said first direction of the cutting edge, and said second workpiece abutting surface limits movement of the workpiece past the cutting edge to define a measured size of the segment being cut from the workpiece.

43. The combination as defined in claim 39 wherein said threaded rod means includes first and second threaded rod members, said workpiece support means is mounted to be moved along an x-axis and a y-axis by respective said first and second threaded rod members, said linear scale means includes first and second elongated means bearing respective sets of equally spaced rotation counting marks laterally spaced from respective zero points for counting rotations of the respective first and second threaded rod members, and said indicator means includes respective first and second pointer means mounted for pointing one at a time to the rotation counting marks of the respective sets of equally spaced rotation counting marks carried by said first and second elongated means.

44. The combination as defined in claim 43 wherein said workpiece support means includes a table member and a saddle member mounted to move with respect to each other along a respective x-axis and y-axis.

45. The combination as defined in claim 43 wherein the tool means is a milling machine.

46. The combination as defined in claim 43 wherein the tool means is a drilling machine.

47. The combination as defined in claim 43 wherein the tool means is a lathe.

* * * * *